(12) United States Patent
Fukumura et al.

(10) Patent No.: US 8,480,306 B2
(45) Date of Patent: *Jul. 9, 2013

(54) BEARING UNIT FOR DRIVING WHEELS

(75) Inventors: Yoshikazu Fukumura, Iwata (JP); Masayuki Kuroda, Iwata (JP); Hisaaki Kura, Iwata (JP); Shin Tomogami, Iwata (JP); Hiroshi Kawamura, Iwata (JP); Shigeaki Fukushima, Iwata (JP)

(73) Assignee: NTN Corporation, Osaka (JP)

( * ) Notice: Subject to any disclaimer, the term of this patent is extended or adjusted under 35 U.S.C. 154(b) by 1141 days.
This patent is subject to a terminal disclaimer.

(21) Appl. No.: 12/227,903

(22) PCT Filed: Mar. 14, 2007

(86) PCT No.: PCT/JP2007/055034
§ 371 (c)(1),
(2), (4) Date: Dec. 2, 2008

(87) PCT Pub. No.: WO2007/145005
PCT Pub. Date: Dec. 21, 2007

(65) Prior Publication Data
US 2009/0129715 A1 May 21, 2009

(30) Foreign Application Priority Data

Jun. 14, 2006 (JP) ................. 2006-165423
Jun. 14, 2006 (JP) ................. 2006-165424
Jun. 22, 2006 (JP) ................. 2006-173157
Jul. 11, 2006 (JP) ................. 2006-190352

(51) Int. Cl.
*F16C 13/02* (2006.01)
*B60B 27/06* (2006.01)
*B21D 53/10* (2006.01)

(52) U.S. Cl.
USPC ........ 384/544; 384/537; 384/589; 301/105.1; 29/898.06

(58) Field of Classification Search
USPC ................. 384/504, 512, 536, 537, 543–544, 384/548, 586, 589, 428; 29/428, 898.062, 29/898.07, 898.06; 464/62, 162, 178; 301/105.1, 124
See application file for complete search history.

(56) References Cited

U.S. PATENT DOCUMENTS 4,300,651 A 11/1981 Krude
4,376,333 A 3/1983 Kanamaru et al.
(Continued)

FOREIGN PATENT DOCUMENTS

JP 55-102723 8/1980
JP 62-51694 10/1987
(Continued)

OTHER PUBLICATIONS

International Preliminary Report on Patentability and Written Opinion of the International Searching Authority mailed Mar. 26, 2009 for International Application No. PCT/JP2007/067191.
(Continued)

*Primary Examiner* — Marcus Charles
(74) *Attorney, Agent, or Firm* — Wenderoth, Lind & Ponack, L.L.P.

(57) ABSTRACT

A bearing unit for driving wheels, and a manufacturing method thereof, includes a hub, a bearing, and a constant velocity universal joint, such that a process for assembling the bearing unit to a knuckle member is simplified. In order to achieve this, a hub (10) and an outer joint member (31) of an out-board side constant velocity universal joint (30) are plastically joined together. An outer peripheral surface (26*a*) of an outer member (26) is press-fitted into an inner peripheral surface of the knuckle member, and a maximum diameter dimension (D1) of the out-board side constant velocity universal joint (30) is set smaller than a minimum diameter dimension (Dn) of the knuckle member (6). Also, a maximum diameter dimension (D2) of an in-board side constant velocity universal joint (40) is set smaller than the minimum diameter dimension (Dn) of the knuckle member (6).

19 Claims, 40 Drawing Sheets

U.S. PATENT DOCUMENTS

| | | | | |
|---|---|---|---|---|
| 4,433,877 | A * | 2/1984 | Colanzi | 384/544 |
| 4,537,270 | A * | 8/1985 | Brandenstein et al. | 384/537 |
| 4,765,688 | A * | 8/1988 | Hofmann et al. | 301/124.1 |
| 4,986,607 | A * | 1/1991 | Hofmann et al. | 301/124.1 |
| 5,536,098 | A * | 7/1996 | Schwarzler | 384/544 |
| 5,674,011 | A * | 10/1997 | Hofmann et al. | 384/448 |
| 5,975,767 | A | 11/1999 | Mizukoshi et al. | |
| 6,488,589 | B2 * | 12/2002 | Ouchi et al. | 464/178 |
| 6,574,865 | B2 * | 6/2003 | Meeker et al. | 29/898.062 |
| 6,821,208 | B2 * | 11/2004 | Krude et al. | 384/589 |
| 6,974,259 | B2 * | 12/2005 | Nomura et al. | 384/544 |
| 7,104,893 | B2 * | 9/2006 | Ouchi et al. | 464/178 |
| 8,132,968 | B2 * | 3/2012 | Fukumura et al. | 384/537 |
| 2001/0004611 | A1 | 6/2001 | Sahashi et al. | |
| 2002/0068639 | A1 | 6/2002 | Tajima et al. | |
| 2003/0002762 | A1 | 1/2003 | Kamura et al. | |
| 2005/0094912 | A1 * | 5/2005 | Ouchi | 384/544 |

FOREIGN PATENT DOCUMENTS

| | | |
|---|---|---|
| JP | 8-226426 | 9/1996 |
| JP | 11-062951 | 3/1999 |
| JP | 11-151904 | 6/1999 |
| JP | 11-153611 | 6/1999 |
| JP | 2001-105806 | 4/2001 |
| JP | 2001-171307 | 6/2001 |
| JP | 2001-171308 | 6/2001 |
| JP | 2001-225606 | 8/2001 |
| JP | 2001-354004 | 12/2001 |
| JP | 2002-070882 | 3/2002 |
| JP | 2002-195254 | 7/2002 |
| JP | 2002-295505 | 10/2002 |
| JP | 2003-13981 | 1/2003 |
| JP | 2003-074569 | 3/2003 |
| JP | 2003-089301 | 3/2003 |
| JP | 2003-090350 | 3/2003 |
| JP | 2003-136908 | 5/2003 |
| JP | 2004-108449 | 4/2004 |
| JP | 2004-270855 | 9/2004 |
| JP | 2005-096617 | 4/2005 |
| JP | 2005-193757 | 7/2005 |
| JP | 2005-256938 | 9/2005 |
| JP | 2005-289255 | 10/2005 |
| JP | 2005-335585 | 12/2005 |
| JP | 2006-052753 | 2/2006 |
| JP | 2006-112532 | 4/2006 |
| JP | 2006-118611 | 5/2006 |

OTHER PUBLICATIONS

International Search Report mailed Jun. 12, 2007 for International Application No. PCT/JP2007/055034.

International Preliminary Report on Patentabilty mailed Jan. 22, 2009 for International Application No. PCT/JP2007/055034.

Written Opinion of the International Searching Authority mailed Jan. 22, 2009 for International Application No. PCT/JP2007/055034.

Japanese Office Action issued Mar. 12, 2012 in corresponding Japanese Patent Application No. 2006-190352 with partial English translation.

Chinese Office Action issued Aug. 21, 2012 in corresponding Chinese Patent Application No. 200780022276.8 with English translation.

Japanese Office Action (and partial English translation) issued Sep. 25, 2012 in Japanese Application No. 2006-190352, which is a foreign counterpart of the present Application.

* cited by examiner

BEARING UNIT FOR DRIVING WHEELS

BACKGROUND OF THE INVENTION

1. Field of the Invention

The present invention relates to a bearing unit and a drive shaft assembly for driving wheels of an automobile (front wheels of FF vehicle, rear wheels of FR vehicle, or any wheels of 4WD vehicle).

2. Description of Related Art

As illustrated in FIG. 45, a drive shaft 1 for transmitting power from an engine to driving wheels connects a stationary constant velocity universal joint J1 on an out-board side (vehicle body side surface side with respect to vehicle width direction) and a slidable constant velocity universal joint J2 on an in-board side (vehicle body center side with respect to vehicle width direction) by an intermediate shaft 2. The constant velocity universal joint J1 on the out-board side is connected to a hub 4 rotatably supported by a wheel bearing 3, and the constant velocity universal joint J2 on the in-board side is connected to a differential 5.

The wheel bearing 3 includes a bearing inner ring 3a fixed to the outer periphery of the hub 4, a bearing outer ring 3b fixed to a knuckle member 6 extending from a suspension on the vehicle body side, and a plurality of rows of rolling elements 3c arranged between the bearing inner ring 3a and the bearing outer ring 3b. Usually, the bearing inner ring 3a is press-fitted onto the outer periphery of the hub 4, whereby the two components are fixed to each other. The bearing outer ring 3b is usually fixed to the knuckle member 6 by fixing a flange 3b1 of the bearing outer ring 3b to the knuckle member 6 by means of a bolt.

When assembling the conventional drive shaft 1 to the vehicle, in a state in which the hub 4 and the wheel bearing 3 are fixed to the knuckle member 6 in advance, the out-board side shaft end of the drive shaft 1 (stem portion 7a of outer joint member 7) is inserted into the inner periphery of the hub 4, and a nut 8 is screwed with the shaft end protruding from the hub 4 (see, for example, Patent Document 1). By fastening the nut 8, the entire drive shaft 1 slides to the out-board side, and a shoulder portion 7b of the outer joint member 7 is brought into contact with an end surface of the bearing inner ring 3a. With this structure, the outer joint member 7 and the hub 4 are positioned in an axial direction, and a predetermined pre-load is imparted to the wheel bearing 3. The outer peripheral surface of the stem portion 7a of the outer joint member 7 and the inner peripheral surface of the hub 4 are connected together by a spline (not shown), and the driving force of the engine transmitted to the outer joint member 7 is transmitted to the wheel via the spline and, further, the hub 4.

[Patent Document 1] JP 2004-270855 A

SUMMARY OF THE INVENTION

Problem to be Solved by the Invention

However, in the above-mentioned conventional process, the knuckle member 6 with the wheel bearing 3 and the hub 4 assembled thereto is kept on standby at a position to which it has been turned from a neutral position around a king pin center in advance, and, in this state, the out-board side constant velocity universal joint J1 is fixed to the hub 4. Further, the knuckle member 6 is restored to the neutral position, and then the in-board side constant velocity universal joint J2 is fixed to the differential 5. Thus, the conventional process requires a rather difficult operation. In addition, it is necessary to perform a number of fastening operations such as the fixation of the bearing outer ring 3b to the knuckle member 6 by a bolt and the fastening of the bolt 8. Thus, the drive shaft assembling operation is rather complicated, which leads to high cost. Further, the conventional process requires many nuts and bolts, that is, it involves a large number of components, which is disadvantageous in terms of cost. Further, because the drive shaft turns as the knuckle member turns, there arises a problem in that a large space for operation is required.

It is possible to omit the nut fastening operation by previously connecting and integrating with each other the outer joint member 7 of the out-board side constant velocity universal joint J1 and the hub 4. However, a large load, including a moment load during cornering, is applied to the connecting portion therebetween as the vehicle travels, and hence there is a need for an inexpensive connection structure having a high strength allowing the connection portion to withstand such a large load.

It is a principal object of the present invention to provide a bearing unit for driving wheels including a hub, a bearing, and a constant velocity universal joint, and further, to simplify a process for assembling a drive shaft assembly to a knuckle member.

Another principal object of the present invention is to achieve a reduction in the number of components, simplification in structure, and a reduction in cost.

Means for solving the Problem

In order to achieve the above-mentioned objects, the present invention provides a bearing unit for driving wheels including: an outer member including a plurality of outer races in an inner periphery thereof; an inner member including a plurality of inner races opposed to the outer races; a plurality of rows of rolling elements arranged between the outer races and the inner races opposed to each other; a hub mounted to a wheel; and an out-board side constant velocity universal joint, in which an outer peripheral surface of the outer member is fit-engaged with and incorporated into an inner peripheral surface of a knuckle member on a vehicle body side, and in which a maximum diameter dimension of the out-board side constant velocity universal joint is smaller than a minimum inner diameter dimension of the knuckle member. The outer peripheral surface of the outer member can be formed in a cylindrical configuration. Here, the term of "constant velocity universal joint" also covers attachments such as a boot and a boot band (which applies to the following description). The maximum outer diameter dimension of the out-board side constant velocity universal joint inclusive of those attachments is set smaller than the minimum inner diameter dimension of the knuckle member.

With this construction, the outer member is incorporated through press-fitting into the knuckle member from the out-board side in a state in which the outer joint member of the out-board side constant velocity universal joint and the hub are connected together, whereby it is possible to fix the bearing unit to the knuckle member. This operation can be performed solely by forcing in the bearing unit in an axle direction. Further, there is basically no need to fix the outer member to the knuckle member by a bolt. Thus, it is possible to simplify the operation of assembling the bearing unit to the vehicle. The connection of the outer joint member and the hub can be effected by plastic joint utilizing plastic flow of a material, welding, or the like, and it is also possible to effect the connection by using a nut as in the prior art.

When effecting incorporation through press-fitting, the outer peripheral surface of the outer member is press-fitted into the inner peripheral surface of the knuckle member, whereby it is possible to firmly connect the outer member and the knuckle member to each other simultaneously with the press-fitting. Further, a bearing clearance may be set to a negative clearance of an appropriate amount. In this case, there is no need to control nut fastening torque to conduct pre-load imparting operation as in the prior art, thus simplifying the pre-load imparting operation.

It is desirable for the hub and the outer joint member of the out-board side constant velocity universal joint to be connected in a non-separate fashion. The non-separate connection may be effected by plastic joint. For example, a male portion provided on one of the hub and the outer joint member is press-fitted into a female portion provided on the other and differing in configuration from the male portion, whereby the hub and the outer joint member are plastically joined to each other. In this case, due to the plastic flow as a result of the press-fitting, a part or all of a void existing at the joining portion between the male portion and the female portion is filled up, and hence the male portion and the female portion are firmly connected to each other for integration. Further, this connection is effected solely by press-fitting one of the male portion and the female portion into the other, which means a satisfactory workability.

In this case, there is provided a difference in hardness between the male portion and the female portion, whereby the portion of higher hardness can be reliably engaged in the portion of lower hardness, and hence it is possible achieve an increase in connection strength. In particular, when, of the male portion and the female portion, the one of higher hardness is formed in a non-circular sectional configuration, the one of higher hardness, formed in a non-circular configuration, can be more easily engaged in the one of lower hardness.

Other examples of a structure in which the outer joint member and the hub are connected in a non-separate fashion include one in which the hub and the outer joint member are connected by expansion caulking, one in which the hub and the outer joint member are connected together by welding, and one in which a spline is interposed between the inner peripheral surface of the hub and the outer peripheral surface of the outer joint member and in which orbital forming is effected to connect the hub and the outer joint member to each other.

By making the PCD of the in-board side rolling elements different from that of the out-board side rolling elements, it is possible to achieve an increase in the load capacity of one of the rolling element rows. Thus, even in a case in which there is a difference in the load applied to the bearing portion between the in-board side and the out-board side, an appropriate design is possible without involving an excessive increase in the size of the bearing unit. The same effect can be obtained by making the diameter dimension of the in-board side rolling elements different from that of the out-board side rolling elements, or by making the number of rolling elements on the in-board side different from that on the out-board side. It is also possible to combine two or more of those constructions (difference in PCD, difference in rolling element diameter, or difference in the number of rolling elements).

Further, by forming one of the rolling element rows in a full-complement-bearing form, it is possible to increase the load capacity of the bearing unit in general.

In the above-mentioned plastic joint, in which the male portion is press-fitted into the female portion, it is desirable for the male portion to be press-fitted into the female portion in an axial center line of the in-board side rolling elements and the out-board side rolling elements. In this case, even if the hub is slightly deformed as a result of the press-fitting, it is possible to prevent the inner race from being thereby affected.

By preventing detachment of the outer member from the knuckle member by means of a snap ring, the connection strength between the outer member and the knuckle member is further enhanced. In this case, when an out-board side portion of a snap ring groove provided in the knuckle member is formed as a tapered surface, the snap ring is guided by the tapered surface to undergo a reduction in diameter by imparting a predetermined pull-out force to the outer member, and hence it is possible separate the knuckle member and the outer member from each other.

Further, when the snap ring is arranged on the out-board side of the axial center line of the in-board side rolling elements and the out-board side rolling elements, it is possible to reduce the sliding distance of the snap ring on the inner peripheral surface of the knuckle member when press-fitting the outer member into the inner periphery of the knuckle member from the out-board side, and hence it is possible to suppress damage of the inner peripheral surface of the knuckle member due to the dragging of the snap ring.

By forming a relief portion in the outer peripheral surface of the outer member, it is possible to control the application range of a compression force generated when the press-fitting into the knuckle member is effected. For example, when a seal member is fixed to the inner peripheral surface of the outer member, the relief portion can be formed in an outer region of the seal member. Further, by providing the relief portion in the outer region between an in-board side outer race and an out-board side outer race, it is possible to reliably impart pre-load to the interior of the bearing through press-fitting while reducing the press-fitting area to improve the press-fitting workability.

As the out-board side constant velocity universal joint, there is used one including the outer joint member, an inner joint member, and torque transmission balls interposed between the outer joint member and the inner joint member.

The outer member may be formed by a pair of bearing outer rings each including an outer race and a spacer interposed between the bearing outer rings. In this case, the rolling elements are incorporated, with the spacer being absent, and then the spacer is inserted between the bearing outer rings, whereby it is possible to incorporate the rolling elements between the inner race and the outer race. As a result, it is possible to form the inner race directly on the hub, making it possible to achieve a reduction in the number of components through omission of the inner ring.

Examples of a possible form of a bearing unit for driving wheels constructed as described above include one in which an inner ring with one inner race formed thereon is fit-engaged with an outer periphery of a hub, and in which the remaining one inner race is formed on the outer peripheral surface of the hub, with the hub and the inner ring forming an inner member, one in which a pair of inner rings is fit-engaged with the outer periphery of the hub, with both the inner rings forming an inner member, one in which inner races one by one are formed respectively on the hub and the outer joint member of the out-board side constant velocity universal joint, with the hub and the outer joint member forming an inner member, and one in which a plurality of inner races are directly formed on the outer peripheral surface of the hub.

It is possible to effect axial positioning of the inner ring and the hub by orbital forming or a snap ring as needed.

In the prior art, a pilot portion fit-engaged with an inner periphery of a wheel is formed integrally with the hub. By providing this pilot portion on a separate member other than the hub, the configuration of the hub is simplified, and hence the hub can be produced not by turning but by a low cost machining method such as forging. In this case, the pilot portion can be formed on a brake rotor. In particular, by producing the brake rotor by casting, it is possible to form the pilot portion at low cost.

A drive shaft assembly is formed by the bearing unit for driving wheels, the intermediate shaft, and the in-board side constant velocity universal joint connected to the in-board side of the out-board side constant velocity universal joint through the intermediation of the intermediate shaft. In this drive shaft assembly, the maximum outer diameter dimensions of the out-board side and the in-board side constant velocity universal joints are made smaller than the minimum inner diameter dimension of the knuckle member.

Due to the above-mentioned construction, the drive shaft assembly can be assembled to the vehicle body in a state in which the drive shaft (including the out-board side constant velocity universal joint, the in-board side constant velocity universal joint, and the intermediate shaft), the bearing portion (including the outer member, the inner race, and the outer race), and the hub are integrated with each other. In performing the assembly, the in-board side constant velocity universal joint, the intermediate shaft, and the out-board side constant velocity universal joint are successively inserted into the inner periphery of the knuckle member, and then the outer peripheral surface of the outer member is fit-engaged with and incorporated into the inner peripheral surface of the knuckle member. This operation can be performed solely by forcing in the assembly in the axle direction. Further, there is no need to fix the outer member to the knuckle member by a bolt. Thus, it is possible to simplify the operation of assembling the drive shaft assembly to the vehicle body.

When performing the fit-engagement incorporation, by press-fitting the outer peripheral surface of the outer member into the inner peripheral surface of the knuckle member, it is possible to firmly connect the outer member and the knuckle member to each other simultaneously with the press-fitting. Further, it is possible to set the bearing clearance as a negative clearance.

When assembling the drive shaft assembly to the knuckle member, the hub and the outer joint member of the out-board side constant velocity universal joint are connected together beforehand. Apart from plastic joint utilizing plastic flow of a material, welding, or the like, the connection of the two components may be effected by using a nut as in the prior art.

In an example of the plastic joint of the hub and the outer joint member, a male portion provided on one of the hub and the outer joint member is press-fitted into a female portion provided on the other and differing in configuration from the male portion, whereby plastic joint is effected between the hub and the outer joint member. In this case, a part or all of the void existing in the joining portion between the male portion and the female portion is filled up as a result of plastic flow due to the press-fitting, and hence it is possible to firmly connect and integrate the male portion and the female portion with each other. Further, this connection is effected solely by press-fitting one of the male portion and the female portion into the other, which leads to satisfactory workability.

In this case, by providing a difference in hardness between the male portion and the female portion, the portion of higher hardness can be reliably engaged in the portion of lower hardness, and hence it is possible to increase the connection strength. In particular, of the male portion and the female portion, the one of higher hardness is formed in a non-circular sectional configuration, the portion of higher hardness, formed in a non-circular configuration, can be engaged more easily in the portion of lower hardness.

The drive shaft assembly includes the out-board side constant velocity universal joint, the intermediate shaft, the in-board side constant velocity universal joint connected to the in-board side of the out-board side constant velocity universal joint through the intermediation of the intermediate shaft, the outer member, a plurality of outer races formed in the inner periphery of the outer member, a plurality of inner races opposed to the outer races, a plurality of rows of rolling elements arranged between the outer race and the inner race opposed to each other, and the hub mounted to the wheel. In the state in which the hub and the outer joint member of the out-board side constant velocity universal joint are connected with each other, the in-board side constant velocity universal joint, the intermediate shaft, and the out-board side constant velocity universal joint are successively inserted into the inner periphery of the knuckle member on the vehicle body side, and then the outer peripheral surface of the outer member is fit-engaged with and incorporated into the inner peripheral surface of the knuckle member, whereby the drive shaft assembly can be assembled to the vehicle body.

The present invention also covers another construction described below.

That is, the present invention also provides a bearing unit for driving wheels including: an outer member having a plurality of outer races in an inner periphery thereof; an inner member having a plurality of inner races opposed to the outer races; a plurality of rows of rolling elements arranged between the outer races and the inner races opposed to each other; a hub mounted to a wheel; and an out-board side constant velocity universal joint, in which a male portion provided on one of the hub and the outer joint member is press-fitted into a female portion provided on the other and differing in configuration from the male portion, whereby plastic joint is effected between the hub and the outer joint member.

With this construction also, a part or all of a void existing in the joining portion between the male portion and the female portion is filled up by plastic flow caused as a result of the press-fitting, and hence it is possible to firmly connect and integrate the male portion and the female portion with each other. Further, this connection is effected solely by press-fitting one of the male portion and the female portion into the other, which is characterized by having satisfactory workability.

In the other construction described above, it is possible to form on the outer peripheral surface of the outer member a flange for mounting to the knuckle member.

Further, in the other construction described above, there is provided a difference in hardness between the male portion and the female portion, whereby the portion of higher hardness can be reliably engaged in the portion of lower hardness, and hence it is possible achieve an increase in connection strength. In particular, when, of the male portion and the female portion, the one of higher hardness is formed in a non-circular sectional configuration, the one of higher hardness, formed in a non-circular configuration, can be more easily engaged in the one of lower hardness.

In the other construction described above, it is possible to fit-engage the outer peripheral surface of the outer member with the inner peripheral surface of the knuckle member on the vehicle body side and incorporate the same thereinto, and to make the maximum outer diameter dimension of the out-board side constant velocity universal joint smaller than the minimum inner diameter dimension of the knuckle member. The outer peripheral surface of the outer member may be formed as a cylindrical surface. Here, the term of "constant velocity universal joint" also covers attachments such as a boot and a boot band (which also applies to the in-board side constant velocity universal joint described below). The maximum outer diameter dimension of the out-board side constant velocity universal joint inclusive of those attachments is set smaller than the minimum inner diameter dimension of the knuckle member.

With this construction, in the state in which the outer joint member of the out-board side constant velocity universal joint and the hub are connected with each other, the outer member is incorporated into and fit-engaged with the knuckle member from the out-board side, whereby it is possible to fix the bearing unit to the knuckle member. This operation can be performed solely by forcing in the bearing unit in the axle direction. Further, there is basically no need to fix the outer member to the knuckle member by a bolt. Thus, it is possible to simplify the operation of assembling the bearing unit to the vehicle. In the case in which there is no particular need for the above-mentioned effect, it is possible to form on the outer peripheral surface of the outer member a flange for mounting to the wheel as in the prior art. By fixing this flange to the knuckle member by a bolt, it is possible to reliably fix the outer member to the knuckle member.

When effecting incorporation through press-fitting, the outer peripheral surface of the outer member is press-fitted into the inner peripheral surface of the knuckle member, whereby it is possible to firmly connect the outer member and the knuckle member to each other simultaneously with the press-fitting. Further, a bearing clearance may be set to a negative clearance of an appropriate amount. In this case, there is no need to control nut fastening torque to conduct pre-load imparting operation as in the prior art, thus simplifying the pre-load imparting operation.

Also in the other construction described above, by making the PCD of the in-board side rolling elements different from that of the out-board side rolling elements, it is possible to achieve an increase in the load capacity of one of the rolling element rows. Thus, even in a case in which there is a difference in the load applied to the bearing portion between the in-board side and the out-board side, an appropriate design is possible without involving an excessive increase in the size of the bearing unit. The same effect can be obtained by making the diameter dimension of the in-board side rolling elements different from that of the out-board side rolling elements, or by making the number of rolling elements on the in-board side different from that on the out-board side. It is also possible to combine two or more of those constructions (difference in PCD, difference in rolling element diameter, or difference in the number of rolling elements).

Further, by forming one of the rolling element rows in a full-complement-bearing form, it is possible to increase the load capacity of the bearing unit in general.

In the other construction described above, it is desirable for the male portion to be press-fitted into the female portion in the axial center line of the in-board side rolling elements and the out-board side rolling elements. In this case, even if the hub is slightly deformed as a result of the press-fitting, it is possible to prevent the inner race from being thereby affected.

Also in the other construction described above, by preventing detachment of the outer member from the knuckle member by means of a snap ring, the connection strength between the outer member and the knuckle member is further enhanced. In this case, when the out-board side portion of the snap ring groove provided in the knuckle member is formed as a tapered surface, the snap ring is guided by the tapered surface to undergo a reduction in diameter by imparting a predetermined pull-out force to the outer member, and hence it is possible separate the knuckle member and the outer member from each other.

Further, when the snap ring is arranged on the out-board side of the axial center line of the in-board side rolling elements and the out-board side rolling elements, it is possible to reduce the sliding distance of the snap ring on the inner peripheral surface of the knuckle member when press-fitting the outer member into the inner periphery of the knuckle member from the out-board side, and hence it is possible to suppress damage of the inner peripheral surface of the knuckle member due to the dragging of the snap ring.

In the other construction described above, by forming a relief portion in the outer peripheral surface of the outer member, it is possible to control the application range of a compression force generated when the press-fitting into the knuckle member is effected. For example, when a seal member is fixed to the inner peripheral surface of the outer member, the relief portion can be formed in the outer region of the seal member. Further, by providing the relief portion in the outer region between the in-board side outer race and the out-board side outer race, it is possible to reliably impart pre-load to the interior of the bearing through press-fitting while reducing the press-fitting area to improve the press-fitting workability.

In the other construction described above, as the out-board side constant velocity universal joint, there is used one including the outer joint member, the inner joint member, and torque transmission balls interposed between the outer joint member and the inner joint member.

Also in the other construction described above, the outer member may be formed by a pair of bearing outer rings each having an outer race and a spacer interposed between the bearing outer rings. In this case, the rolling elements are incorporated, with the spacer being absent, and then the spacer is inserted between the bearing outer rings, whereby it is possible to incorporate the rolling elements between the inner race and the outer race. As a result, it is possible to form the inner race directly on the hub, making it possible to achieve a reduction in the number of components through omission of the inner ring.

In the other construction described above, the out-board side constant velocity universal joint and the in-board side constant velocity universal joint are connected together through the intermediation of the intermediate shaft, and the maximum outer diameter dimensions of both constant velocity universal joints are made smaller than the minimum inner diameter dimension of the knuckle member, whereby it is possible to assemble the bearing unit for driving wheels to the vehicle body as an assembly in which the drive shaft having the out-board side and the in-board side constant velocity universal joints and the hub are integrated with each other. This assembly can be conducted by successively inserting the in-board side constant velocity universal joint and the out-board side constant velocity universal joint into the inner periphery of the knuckle member, and then press-fitting the outer member into the inner periphery of the knuckle member.

Examples of a possible form of a bearing unit for driving wheels in the other construction described above include one in which an inner ring with one inner race formed thereon is fit-engaged with an outer periphery of a hub, and in which the remaining one inner race is formed on an outer peripheral surface of the hub, with the hub and the inner ring forming an inner member, one in which a pair of inner rings is fit-engaged with the outer periphery of the hub, with both the inner rings forming an inner member, one in which inner races one by one are formed respectively on the hub and the outer joint member of the out-board side constant velocity universal joint, with the hub and the outer joint member forming an inner member, and one in which a plurality of inner races are directly formed on the outer peripheral surface of the hub.

In the other construction described above, it is possible to effect axial positioning of the inner ring and the hub by orbital forming or a snap ring as needed.

In the prior art, a pilot portion fit-engaged with the inner periphery of the wheel is formed integrally with the hub. In the other construction described above, by providing this pilot portion on a separate member other than the hub, the configuration of the hub is simplified, and hence the hub can be produced not by turning but by a low cost machining method such as forging. In this case, the pilot portion can be formed on a brake rotor. In particular, by producing the brake rotor by casting, it is possible to form the pilot portion at low cost.

Effect of the Invention

According to the present invention, it is possible to simplify the bearing unit for driving wheels including the hub, the bearing, and the out-board side constant velocity universal joint, and further, the process for assembling to the vehicle the drive shaft assembly including the hub, the bearing, the out-board side constant velocity universal joint, and the in-board side constant velocity universal joint.

DETAILED DESCRIPTION OF THE INVENTION

A bearing unit for driving wheels according to an embodiment of the present invention is described in detail below.

Figure 1:
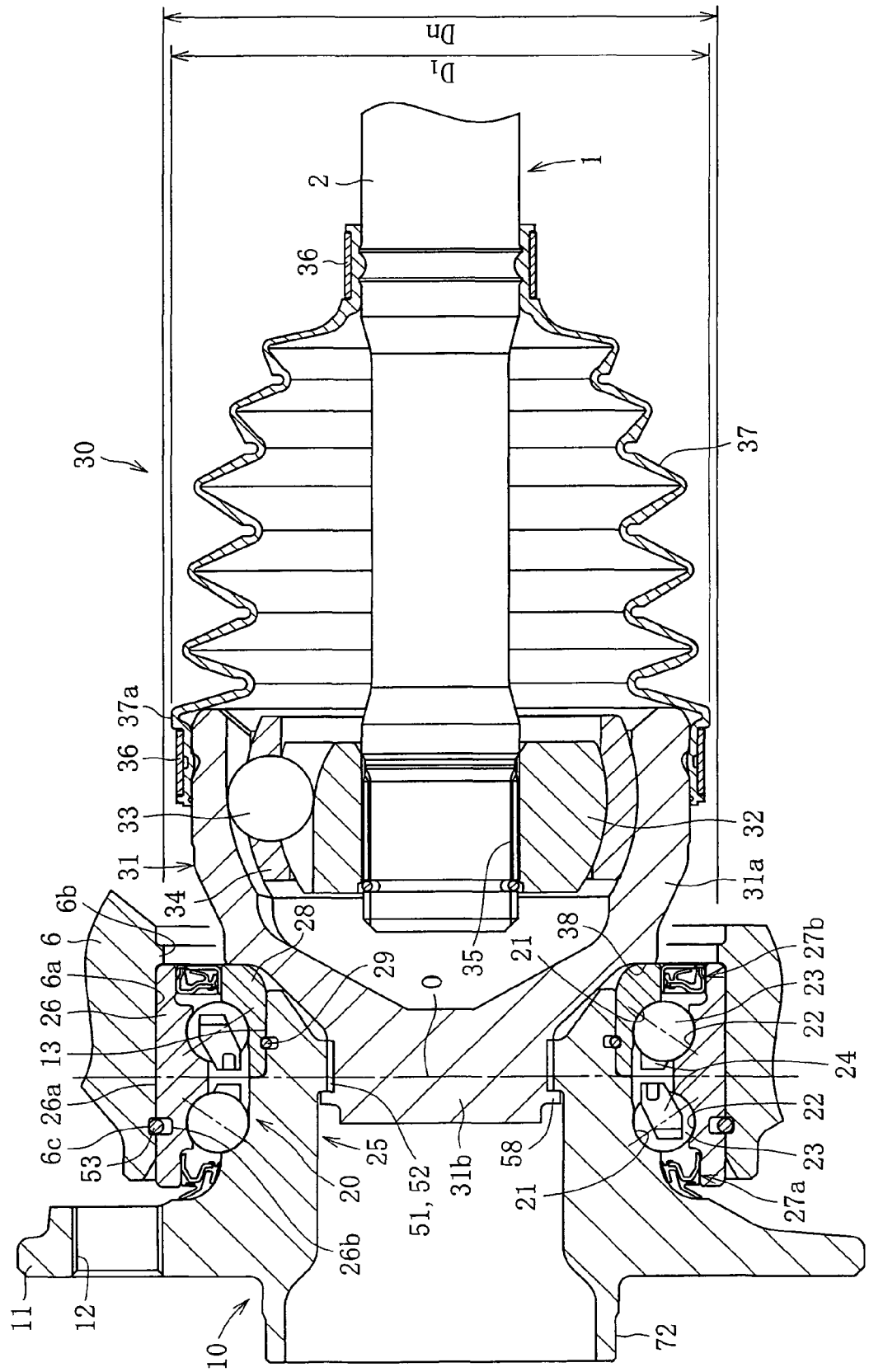
FIG. 1 A sectional view of a bearing unit for driving wheels.

FIG. 1 illustrates a bearing unit for driving wheels including a hub 10, a bearing portion 20, and an out-board side constant velocity universal joint 30.

The hub 10 includes on the outer peripheral surface thereof a wheel mounting flange 11 for mounting a wheel (not shown). A plurality of female screws 12 are formed circumferentially in the wheel mounting flange 11, and wheel bolts (not shown) for fixing a wheel and a disc in position are screwed with the female screws 12. An inner ring 28 is press-fitted with appropriate interference onto a small diameter step portion 13 formed on the outer peripheral surface of the hub 10. A snap ring 29 is interposed between the inner peripheral surface of the inner ring 28 and the outer peripheral surface of the small diameter step portion 13, and axial positioning is effected on the inner ring 28 and the hub 10 by the snap ring 29. The hub 10 is produced by turning or forging.

The bearing portion 20 is formed as a double row angular contact ball bearing of back-to-back arrangement, and includes an outer member 26, double-row inner races 21 and outer races 22, rolling elements 23 arranged between the inner races 21 and the outer races 22 opposed to each other, and a cage 24 for retaining an out-board side rolling element row (on the left-hand side in the drawing) and an in-board side rolling element row (on the right-hand side in the drawing) at equal circumferential intervals. In the example illustrated, the out-board side inner race 21 is formed on the outer peripheral surface of the hub 10, and the in-board side inner race 21 is formed on the outer peripheral surface of the inner ring 28. In this case, the hub 10 and the inner ring 28 constitute an inner member 25 having the double-row inner races.

The outer races 22 are formed on the inner peripheral surface of the outer member 26, which is formed as a ring-like integral member. An outer peripheral surface 26a of the outer member 26 is generally formed as a cylindrical surface of a uniform diameter except for a snap ring groove 26b. Unlike the conventional outer member, it is not provided with a flange for mounting to a knuckle member 6. Seals 27a and 27b are press-fitted and fixed in portions of the inner peripheral surface of the outer member 26 at both axial ends thereof.

The out-board side seal 27a includes a plurality of (e.g., three) seal lips formed on the inner side by covering cores with an elastic material such as rubber. By press-fitting the cores into the inner peripheral surface of the outer member 26, the seal is fixed to the outer member 26. The seal lips are in contact with the outer peripheral surface of the hub 10 and the in-board side end surface of the flange portion 11.

The in-board side seal 27b is one called a cassette seal, and includes a plurality of (e.g., three) seal lips formed on the inner side of cores and held in contact with a slinger of a reverse-L-shaped sectional configuration. The cores are press-fitted into the inner peripheral surface of the outer member 26, and the slinger is press-fitted into the outer peripheral surface of the inner ring 28, whereby the seal 27b is fixed to an opening. Due to the seals 27a and 27b, the openings at both ends of the bearing portion 20 are sealed, and leakage of grease filling the interior and intrusion of water and foreign matter from the exterior are prevented.

While in the bearing portion 20 of the example illustrated balls are used as the rolling elements 23, it is also possible to use conical rollers as the rolling elements 23 when, for example, the vehicle weight is large.

The out-board side constant velocity universal joint 30 includes an outer joint member 31 provided at one end on the out-board side of the intermediate shaft 2 and having in the inner peripheral surface thereof a curved track groove, an inner joint member 32 having in the outer peripheral surface thereof a curved track groove opposed to the track groove of the outer joint member 31, torque transmission balls 33 incorporated between the track groove of the outer joint member 31 and the track groove of the inner joint member 32, and a cage 34 interposed between the outer joint member 31 and the inner joint member 32 and retaining the torque transmission balls 33 at equal circumferential intervals. The inner joint member 32 is connected to the out-board side shaft end of the intermediate shaft 2, which is inserted into the inner periphery thereof, through the intermediation of a serration 35.

The outer joint member 31 is produced, for example, by forging, and includes a mouth portion 31a for accommodating the inner joint member 32, the cage 34, and the torque transmission balls 33, and a solid stem portion 31b integral with the mouth portion 31a and extending axially therefrom. A large diameter open end and a small diameter open end of a bellows-like boot 37 are respectively fixed to the outer peripheral surface on the mouth portion 31a opening side and the outer peripheral surface of the intermediate shaft 2 through the intermediation of boot bands 36. By thus covering the space between the outer side joint member 31 and the intermediate shaft 2 with the boot 37, leakage of the grease to the exterior and intrusion of water, dust, etc. into the interior of the joint are prevented.

The stem portion 31b of the outer joint member 31 is connected to the hub 10 by one of the various connection structures described below. While it is possible to adopt a reversible connection method using a nut, it is desirable to adopt a non-separation type connection structure in which reversible separation/connection of the hub 10 and the outer joint member 31 is not allowed.

When connecting the hub 10 and the outer joint member 31 in a non-separable fashion, a shoulder surface 38 of the outer joint member 31 is brought into contact with the in-board side end surface of the inner ring 28, and further, the out-board side end surface of the inner ring 28 is brought into contact with the hub 10 in the axial direction, whereby the interval of the double-row inner races 21 is maintained at a preset dimension, and a pre-load (preliminary load) is imparted.

In the present invention, the outer peripheral surface of the outer member 26 is fit-engaged with and incorporated into the inner peripheral surface 6a of the knuckle member 6 on the vehicle body side.

Here, the expression of "fit-engagement incorporation" means that, by fit-engaging the outer member 26 with the knuckle member 6, the incorporation of both members is completed. This incorporation can be effected, for example, by press-fitting the cylindrical outer peripheral surface 26a of the outer member 26 into the cylindrical inner peripheral surface 6a of the knuckle member 6 from the out-board side.

At the in-board side end portion of the inner peripheral surface 6a of the knuckle member 6, there is provided as needed a protrusion 6b axially engaged with an end surface of the outer member 26. Or, there is interposed the snap ring 53 between the outer peripheral surface of the outer member 26 and the inner peripheral surface 6a of the knuckle member 6. By using the protrusion 6b and the snap ring 53, the detachment prevention effect for the outer member 26 and the knuckle member 6 is further enhanced. As illustrated in FIG. 1, in the case in which both the snap ring 53 and the protrusion 6b are provided, the in-board side end surface of the outer member 26 press-fitted from the out-board side abuts the protrusion 6b, and at the same time, a snap ring groove 6c formed in the inner peripheral surface 6a of the knuckle member 6 and a snap ring groove 26b formed in the outer peripheral surface 26a of the outer member 26 are opposed to each other. As a result, the snap ring 53 accommodated in the snap ring groove 26b of the outer member 26 elastically expands to be axially engaged with both the knuckle member 6 and the outer member 26.

Figure 35:
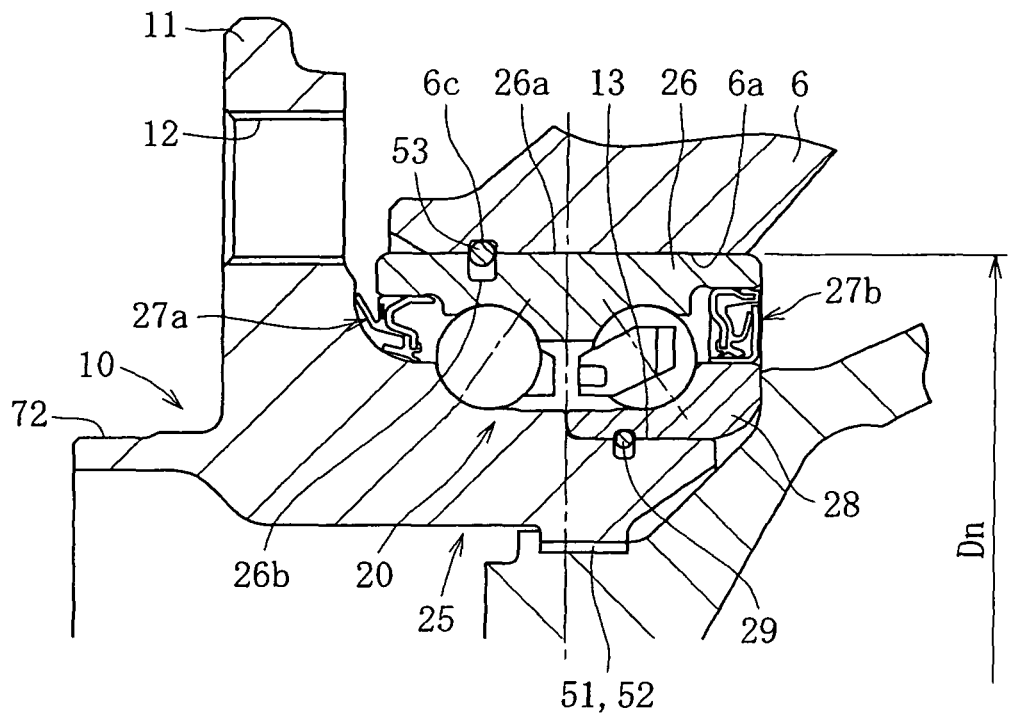
FIG. 35 An enlarged sectional view of a main portion of a bearing unit for driving wheels.
Figure 36:
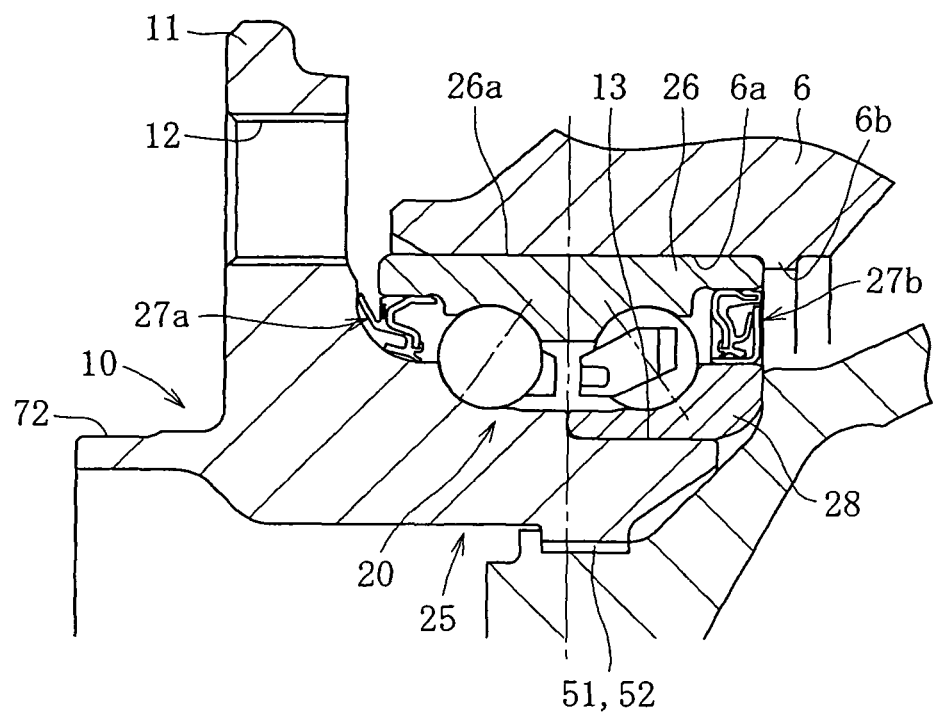
FIG. 36 An enlarged sectional view of a main portion of a bearing unit for driving wheels.

In the case in which a sufficient fixation force is to be obtained solely by press-fitting, it is possible to omit one or both of the protrusion 6b and the snap ring 53. FIG. 35 illustrates the case in which the protrusion 6b is omitted, and FIG. 36 illustrates the case in which the snap ring 53 is omitted (As illustrated in FIG. 36, it is also possible to omit the snap ring 29 between the hub 10 and the inner ring 28.)

When using the snap ring 53, it is desirable for the snap ring 53 to be arranged as far as possible on the out-board side. More specifically, as illustrated in FIG. 1, it is desirable to arrange the snap ring 53 on the out-board side of an axial center line O between the in-board side rolling elements 23 and the out-board side rolling elements 23. As a result, when press-fitting the outer member 26 into the knuckle member 6, it is possible to shorten the sliding distance of the snap ring 53 with respect to the inner peripheral surface 6a of the knuckle member, and hence it is possible to avoid damage of the inner peripheral surface 6a of the knuckle member due to drag of the snap ring 53.

In this way, a press-fitting surface is provided on the outer peripheral surface 26a of the outer member 26, and the outer member 26 is press-fitted into the inner periphery of the knuckle member 6 for fixation, whereby, as compared with the conventional construction in which the flanged outer member is fixed to a plurality of portions of the knuckle member by bolts, it is possible to omit the bolt fastening operation, and to achieve a reduction in cost by reducing the number of components and the operation man-hours involved by just that much.

Further, by press-fitting the outer member 26 into the knuckle member 6, a radial converging force is applied to the outer member 26 after press-fitting, and due to this converging force, the bearing clearance is reduced. Thus, by appropriately setting the press-fitting interference taking into account the above-mentioned preliminary load, it is possible to obtain a proper amount of negative clearance (e.g., 0 to 100 μm, more preferably, 0 to 30 μm) after press-fitting. In this case, there is no need to perform the pre-load imparting operation through nut fastening, and hence it is possible to further improve the workability in the bearing unit mounting operation. In the case of a positive clearance larger than 0, the bearing rigidity is rather insufficient, resulting in a reduction in durability. Conversely, when the negative clearance amount exceeds 100 μm, the pre-load becomes excessively large, which leads to abnormal heat generation.

In this fit-engagement incorporation, a maximum outer diameter dimension D1 of the out-board side constant velocity universal joint 30 is made smaller than a minimum inner diameter dimension Dn of the knuckle member 6 (D1<Dn). As a result, by first inserting the out-board side constant velocity universal joint 30 into the inner periphery of the knuckle member 6, and then press-fitting the outer member 26 of the bearing portion 20 into the inner periphery of the knuckle member 6, it is possible to mount to the vehicle the hub 10, the bearing portion 20, and the out-board side constant velocity universal joint 30 in a pre-assembled state. At the time of this mounting, the assembly is forced in a constant direction, and hence the workability at the time of mounting is satisfactory.

Here, the "minimum inner diameter dimension Dn" of the knuckle member 6 means the inner diameter dimension of the portion on the innermost side of the knuckle member 6. When, as in the embodiment illustrated in FIG. 1, the protrusion 6b is provided on the inner peripheral surface of the knuckle member 6, the inner diameter dimension of the protrusion 6b is the "minimum inner diameter dimension." When, as illustrated in FIG. 35, the protrusion 6b is omitted, the inner peripheral surface 6a of the knuckle member 6 is the "minimum inner diameter dimension."

The "maximum outer diameter dimension D1" of the out-board side constant velocity universal joint refers to the outer diameter dimension of the outermost portion inclusive of the attachments such as the boot 37 and the boot bands 36. For example, in the out-board side constant velocity universal joint 30 illustrated in FIG. 1, the outer diameter dimension of a boot maximum diameter portion 37a is the maximum outer diameter dimension D1 of the out-board side constant velocity universal joint 30.

Figure 4:
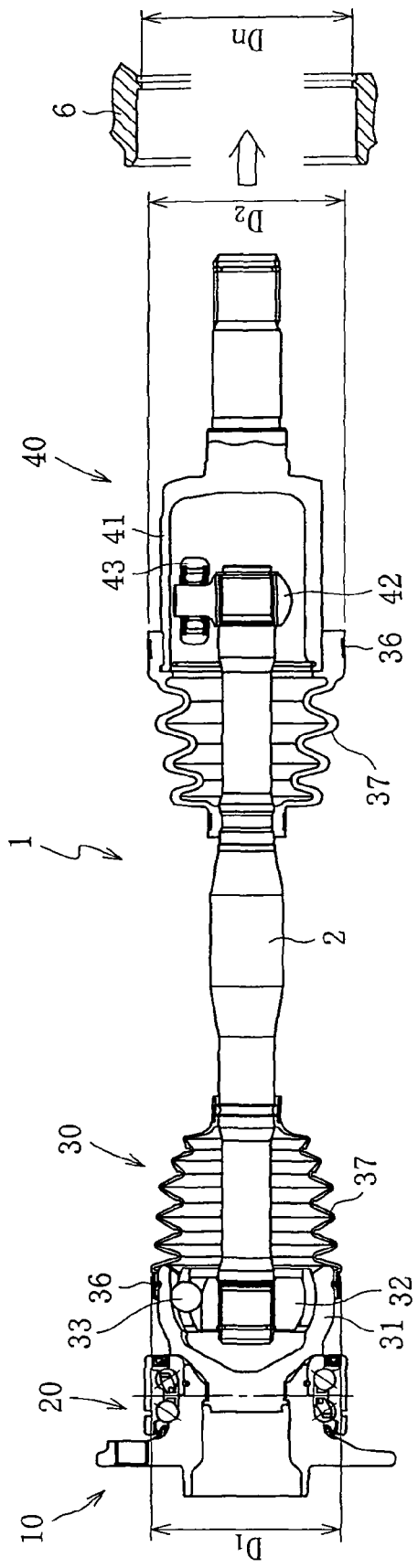
FIG. 4 A sectional view of a drive shaft.

FIG. 4 illustrates a drive shaft assembly. As illustrated in the drawing, this assembly includes a drive shaft 1, the hub 10, and the bearing portion 20. In the drive shaft 1, the out-board side constant velocity universal joint 30 (stationary type constant velocity universal joint) and an in-board side constant velocity universal joint 40 (sliding type constant velocity universal joint) are connected to each other through the intermediation of the intermediate shaft 2.

When, as in the case of the out-board side constant velocity universal joint 30 of the drive shaft 1, the maximum outer diameter dimension D2 of the in-board side constant velocity universal joint 40 is made smaller than the minimum inner diameter dimension Dn of the knuckle member 6 (D2<Dn), it is possible to mount the drive shaft assembly, obtained by forming the drive shaft 1, the hub 10, and the bearing portion 20 into an assembly, to the vehicle. That is, the drive shaft assembly is successively inserted into the inner periphery of the knuckle member 6 in the following order: the in-board side constant velocity universal joint 40, the intermediate shaft 2, and the out-board side constant velocity universal joint 30, and then the outer peripheral surface 26a of the outer member 26 is press-fitted into the inner peripheral surface of the knuckle member 6, whereby the mounting of the drive shaft assembly to the vehicle is completed. As a result, it is possible to reduce the operation man-hours at the mounting operation site, thereby achieving an improvement in terms of workability. In this case, there is no need to turn the knuckle member 6 as in the prior art, and hence the requisite operation space can be minimized. As in the case of the out-board side constant velocity universal joint 30, the maximum outer diameter dimension D2 of the in-board side constant velocity universal joint 40 means the maximum outer diameter dimension of the in-board side constant velocity universal joint 40 inclusive of the boot 37 and the boot bands 36.

The in-board side constant velocity universal joint 40 is formed, for example, of a tripod constant velocity universal joint. The in-board side constant velocity universal joint 40 mainly includes an outer joint member 41 provided at one end on the in-board side of the intermediate shaft 2 and having in the inner peripheral surface thereof a linear track groove, a roller 43 rolling in the track groove of the outer joint member 41, and an inner joint member 42 rotatably supporting the roller 43. As the in-board side constant velocity universal joint 40, a double offset type constant velocity universal joint may be used.

Figure 5:
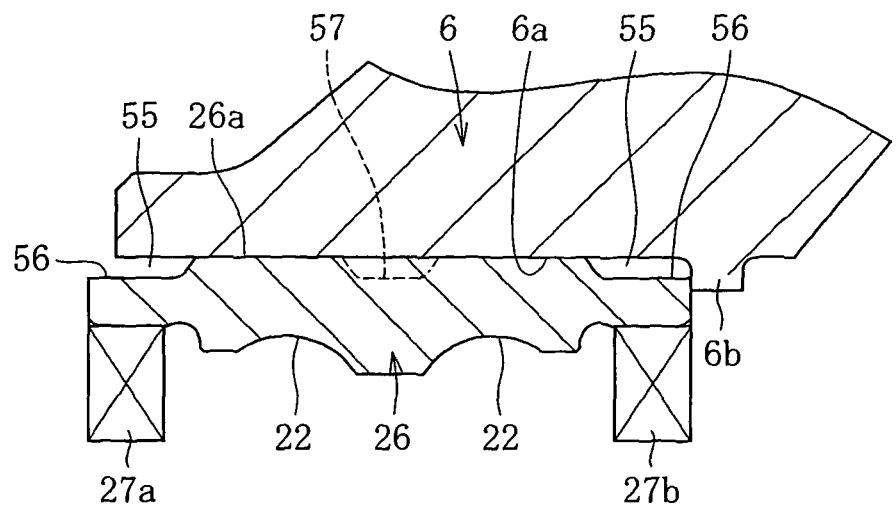
FIG. 5 An enlarged sectional view of a press-fitting portion of an outer member and a knuckle member.

As illustrated in FIG. 5, it is desirable to form gaps 55 between the outer regions of the outer peripheral surface 26a of the outer member 26 corresponding to the seals 27a and 27b and the inner peripheral surface 6a of the knuckle member 6 opposed thereto. The gaps 55 may be formed, as illustrated in the drawing, by forming relief portions 56 on the outer peripheral surface 26a of the outer member 26. Instead, it is also possible to form the gaps 55 by forming relief portions (not shown) on the inner peripheral surface 6a of the knuckle member 6. It is only necessary for the press-fitting interference between the outer member 26 and the knuckle member to be secured in the outer region of the outer races 22, and hence, as indicated by dashed lines in the drawing, it is also possible to further form a relief portion 57 in the outer region between the outer races 22. This helps to reduce the press-fitting area, and hence it is possible to further enhance the workability in press-fitting. Further, it is possible to impart a preset pre-load to the bearing portion 20 at the time of press-fitting.

Regarding the press-fitting of the outer member 26, when the press-fitting interference is set uniform on the outer side of each outer race 22, it is possible to stabilize the amount of pre-load imparted to the bearing portion 20.

Figure 6:
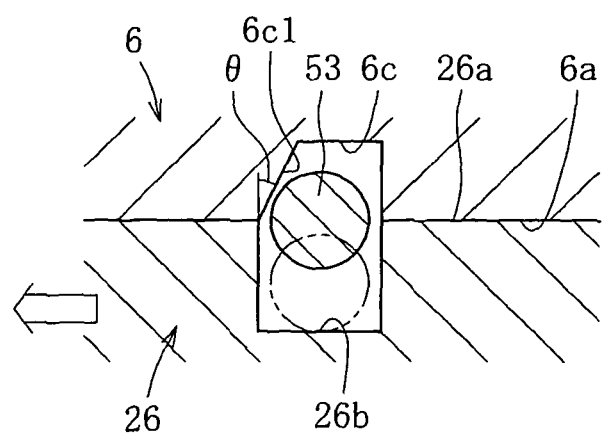
FIG. 6 An enlarged sectional view of a press-fitting portion of an outer member and a knuckle member.

As illustrated in FIG. 6, an out-board wall surface 6c1 of the snap ring groove 6c formed in the inner peripheral surface 6a of the knuckle member 6 may be formed as a tapered surface. In this case, when the outer member 26 is pulled out to the out-board side with a predetermined force as indicated by the arrow, the snap ring 53 undergoes a reduction in diameter while guided by the tapered surface 6c1, and hence the drive shaft assembly can be separated from the knuckle member 6, making it possible to enhance the workability in the maintenance operation and replacement operation for the assembly. From the viewpoint of compatibility between the detachment prevention effect at the time of fit-engagement incorporation and the workability at the time of replacement, it is desirable for the angle θ of the tapered surface 6c1 to be set within the range of 15° to 30°.

Figure 7A:
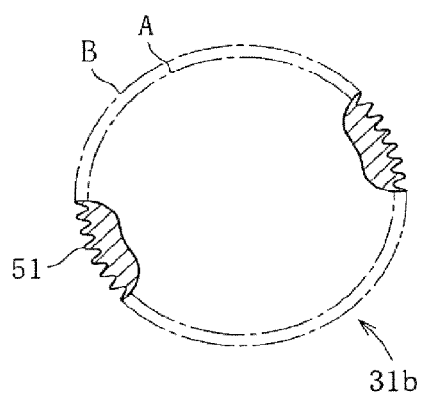
FIG. 7a A sectional view of a male portion in a connecting portion between a hub and an outer joint member.
Figure 7B:
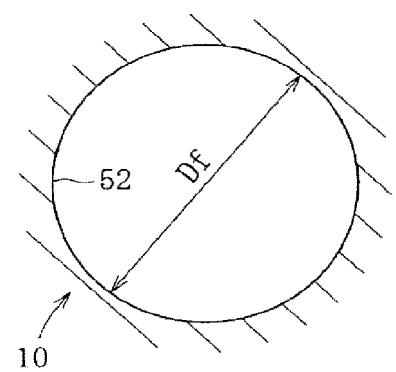
FIG. 7b A sectional view of a female portion in a connecting portion between a hub and an outer joint member.
Figure 7C:
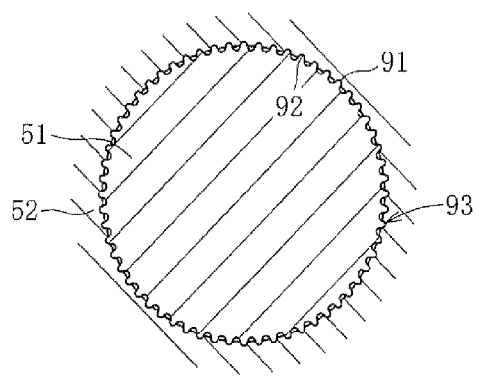
FIG. 7c A sectional view of the male portion shown in FIG. 7a fitted into the female portion shown in FIG. 7b.

The hub 10 and the outer joint member 31 are connected together by plastic joint. This plastic joint is effected by forming a male portion 51 on one of the hub 10 and the outer joint member 13 and forming a female portion 52 which has a different configuration from the male portion on the other, and press-fitting the male portion 51 into the female portion 52. In FIG. 1, the male portion 51 is formed on the stem portion 31b of the outer joint member 31, and the female portion 52 is formed on the in-board side end portion of the hub 10. One of the male portion 51 and the female portion 52 is formed in a circular sectional configuration, and the other is formed in a non-circular sectional configuration. FIGS. 7a and 7b illustrate, by way of example, a case in which the male portion 51 is formed as a rugged surface like a serration (having projections 91 as shown in FIG. 7c) and in which the female portion 52 is formed as a cylindrical surface. The male portion 51 of a non-circular sectional configuration can be formed efficiently and with high precision by forging or rolling.

Figure 8:
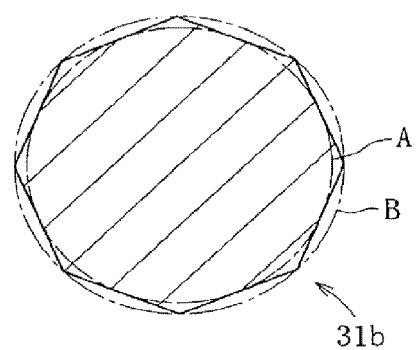
FIG. 8 A sectional view of another construction example of the male portion.

Apart from this, as the configuration of the male portion 51, it is also possible to adopt a prism-like configuration as illustrated in FIG. 8. Whichever configuration may be adopted, the inner diameter dimension Df of the female portion 52 of a circular sectional configuration is larger than the diameter of a circle A internally touching the section contour line of the male portion 51 and smaller than the diameter of a circle B externally touching the same.

By press-fitting the male portion 51 of the configuration described above into the inner periphery of the female portion 52, plastic flow is generated such that recesses 92 fitting to the projections 91 are formed in the female portion 52 in a fitting portion 91, as shown in FIG. 7c, to fill all or a part of the gap between the male portion 51 and the female portion 52. As a result, plastic joint and integration is effected between the hub 10 and the outer joint member 31.

Figure 9:
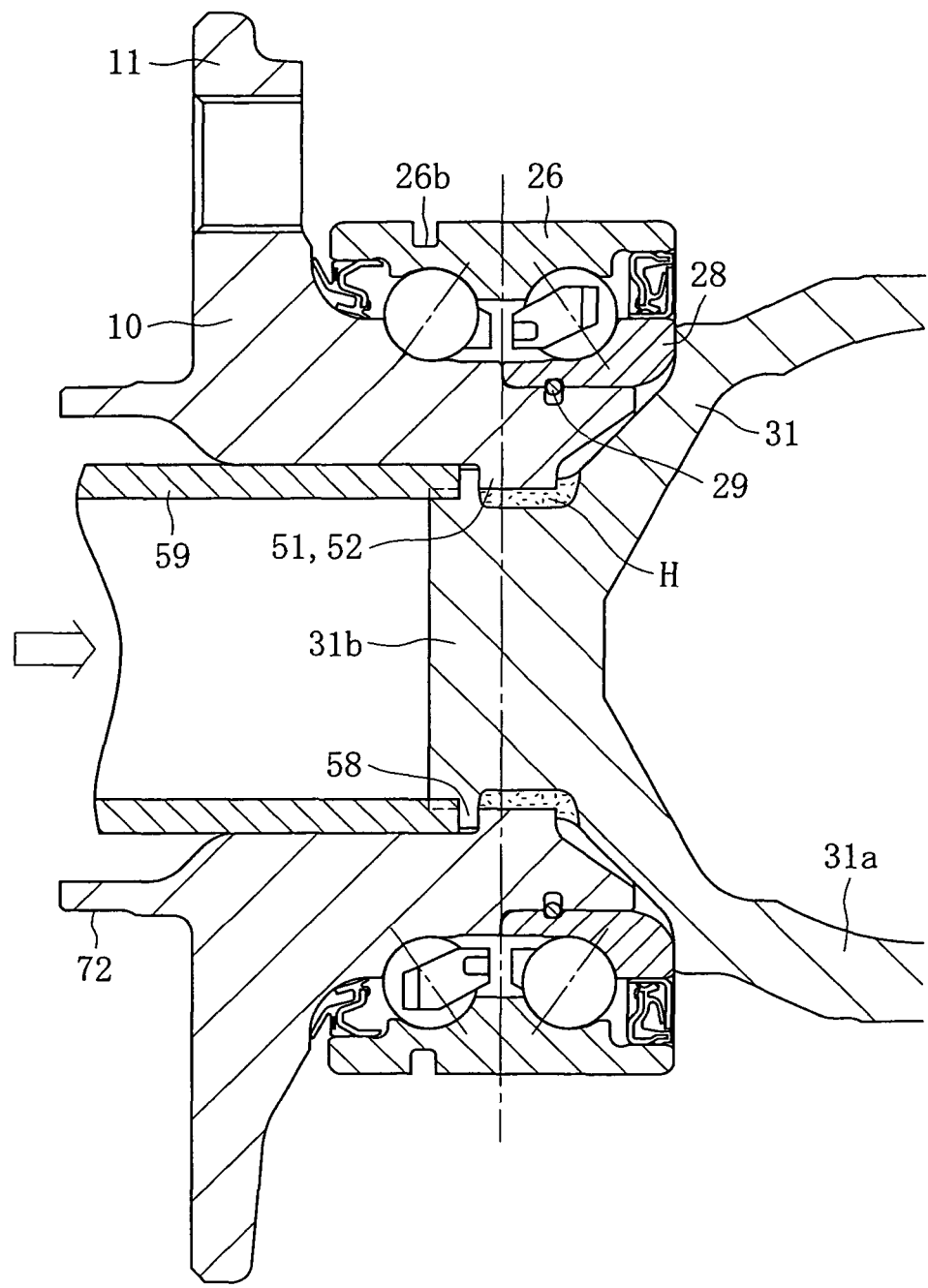
FIG. 9 A sectional view illustrating a plastic joint process for a hub and an outer joint member.

As illustrated in FIG. 9, when, after the press-fitting, the outer peripheral portion of the solid shaft end portion of the stem portion 31b (indicated by dashed lines) is caulked by a caulking tool 59 to form a flange portion 58, the detachment prevention effect of the hub 10 is further enhanced. If a sufficient connection strength is to be attained by press-fitting alone, this caulking process may be omitted.

In this connection structure, it is desirable to previously perform heat treatment on the male portion 51 of a non-circular sectional configuration to make the surface layer H thereof harder than the female portion 52. This helps to suppress deformation of the male portion 51 due to the press-fitting and enables the male portion 51 to be easily engaged in the female portion 52, and hence it is possible to further enhance the connection strength. When performing the caulking as illustrated in FIG. 9, the shaft end portion of the stem portion 31b to be subjected to plastic deformation through caulking is left unquenched, thus facilitating the formation of the flange portion 58. As the heat treatment method for the male portion 51, it is desirable to adopt induction quenching, in which the quenching range and the quenching depth can be easily controlled. The female portion 52 is basically formed of a crude material that has undergone no heat treatment. However, if its surface hardness does not exceed that of the male portion 51, heat treatment may be performed thereon.

While in the example described above the male portion 51 is formed in a non-circular sectional configuration and the female portion 52 is formed in a circular sectional configuration, it is also possible to form, conversely, the male portion 51 in a circular sectional configuration and the female portion 52 in a non-circular sectional configuration if no particular problems in terms of cost and the like are involved. The male portion 52 of a non-circular sectional configuration may be formed, for example, by broaching. In this case, the female portion 52 of a non-circular sectional configuration is formed in a hardness higher than that of the male portion 51 of a circular sectional configuration.

When the male portion 51 is press-fitted into the female portion 52, the hub 10 is deformed slightly so as to expand, which may affect the inner races 21. In order to avoid this as much as possible, it is desirable for the press-fitting portions of both to be arranged, as illustrated in FIG. 1, in the axial center line O of the in-board side and the out-board side rolling elements 23.

As illustrated in FIGS. 11 through 17, it is also possible to use a bearing unit for driving wheels of the type in which the out-board side inner race 21 is formed on the outer peripheral surface of the hub 10 and in which the in-board side inner race 21 is formed on the outer peripheral surface of the outer joint member 31. In the bearing unit of FIGS. 11 through 17, the hub 10 and the outer joint member 31 are connected together in a non-separable fashion, and the shoulder surface 38 and the end surface of the outer joint member 31 abut the hub 10 in the axial direction, whereby the dimension between the double row inner races 21 is determined, and a pre-load is imparted to the bearing portion 20. In this case, the hub 10 and the outer joint member 31 form the inner member 25 having the double row inner races 21.

Of FIGS. 11 through 17, FIG. 11 illustrates a case in which plastic joint is effected between the hub 10 and the outer joint member 31 through expansion caulking. In the expansion caulking, the stem portion 31b of the outer joint member 31 is formed as a hollow portion, and has at the out-board side end thereof a small diameter portion 31b1 of a relatively small inner diameter dimension. After inserting the stem portion 31b into the inner periphery of the hub 10, a mandrel having a diameter larger than the inner diameter dimension of the small diameter portion 31b1 is forced into the inner periphery of the stem portion 31b to expand the small diameter portion 31b1 and to bring the small diameter portion 31b1 into press contact with the inner peripheral surface of the hub 10, whereby plastic joint is effected between the hub 10 and the outer joint member 31. When an asperity portion 15 is previously formed on the inner peripheral surface of the hub 10 by knurling or the like, and heat treatment is conducted on the asperity portion 15, the asperity portion 15 can be reliably engaged in the outer peripheral surface of the stem portion 31b when the small diameter portion 31b1 expands, making it possible to effect firm plastic joint between the hub 10 and the outer joint member 31.

When, as in the case of expansion caulking, the stem portion 31b of the outer joint member 31 is formed as a follow portion, it is desirable to attach a cap 39 to the inner peripheral surface of the stem portion 31b in order to avoid intrusion of foreign matter into the mouth portion 31a and leakage of grease.

Figure 12:
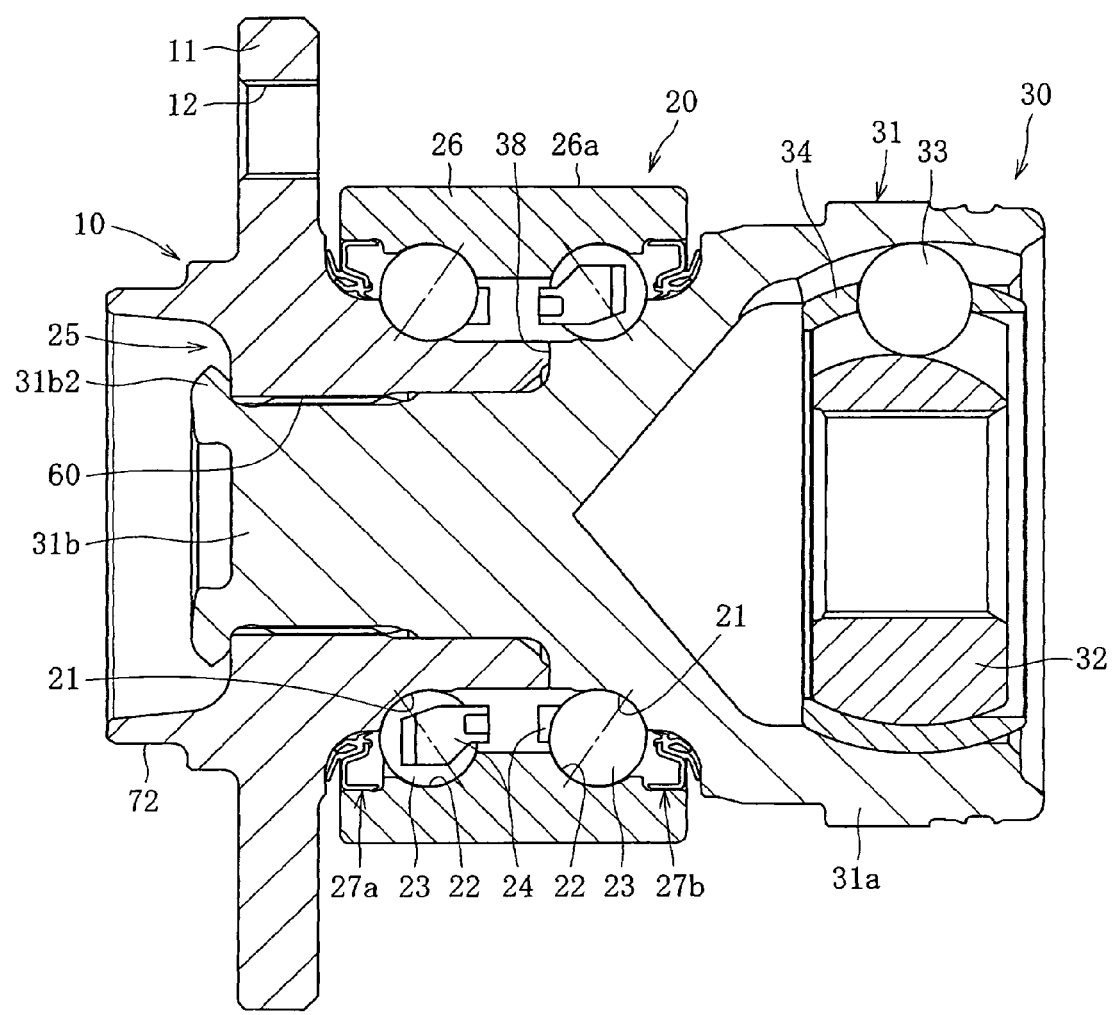
FIG. 12 A sectional view of a bearing unit for driving wheels.

FIG. 12 illustrates a construction in which the hub 10 and the outer joint member 31 are connected together in a non-separable fashion by a method called orbital forming. In orbital forming, the out-board side shaft end portion of the stem portion 31b is formed in a cylindrical configuration, and the cylindrical portion is caused to undergo outward plastic deformation through oscillating of the forming tool to thereby form a flange 31b2. By holding the flange 31b2 in contact with the end surface of the hub 10, detachment of the hub 10 is prevented, and, by forming a spline 60 between the inner peripheral surface of the hub 10 and the outer peripheral surface of the stem portion 31b, rotation prevention is effected on the hub 10 and the outer joint member 31.

Figure 13:
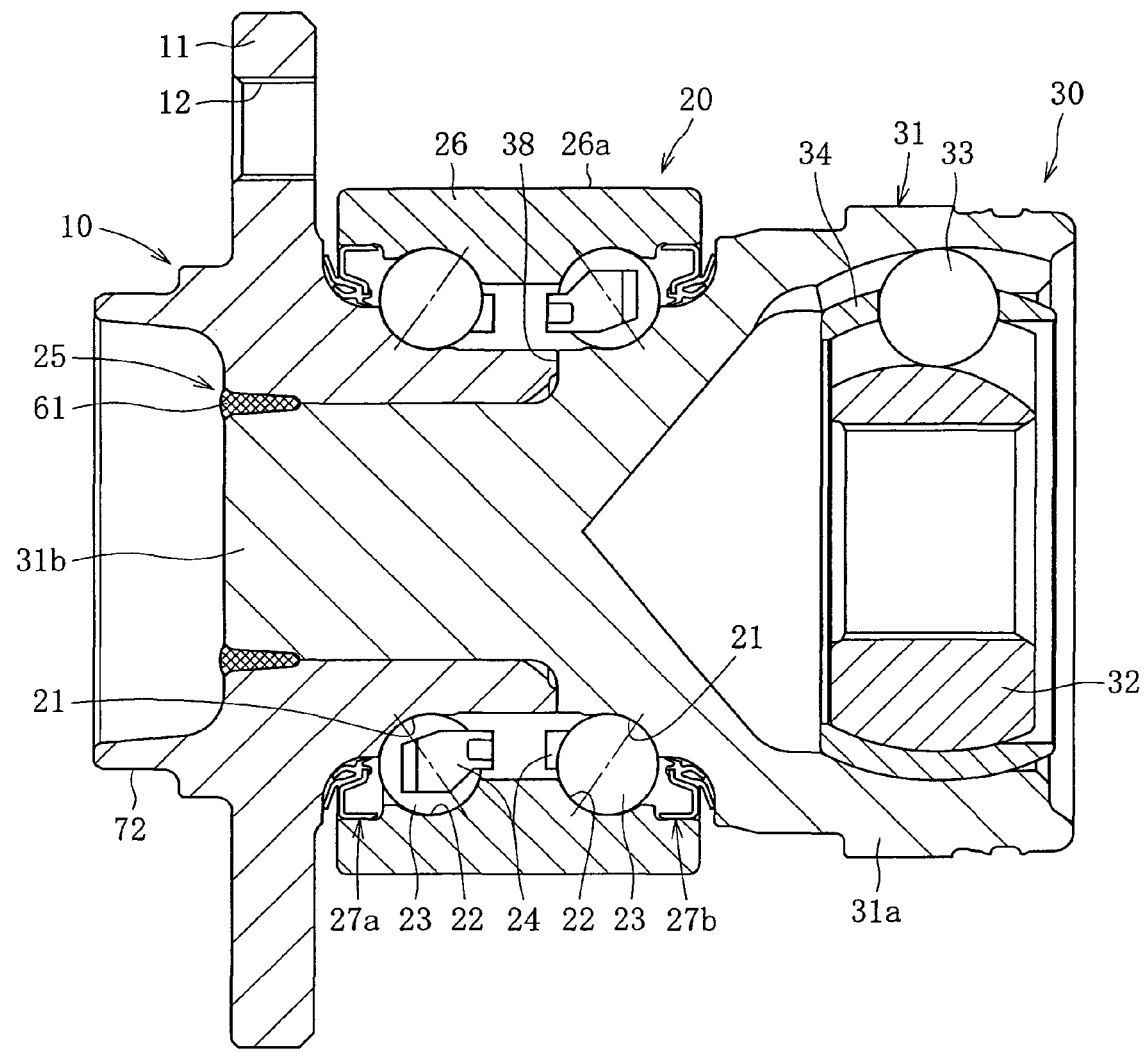
FIG. 13 A sectional view of a bearing unit for driving wheels.

FIG. 13 illustrates a construction in which the hub 10 and the outer joint member 31 are connected together in a non-separable fashion by welding (the welded portion is indicated by numeral 61). Examples of the welding method include laser beam welding, plasma welding, electron beam welding, and projection welding based on a high-speed pulse system. The stem portion 31b is press-fitted into the inner periphery of the hub 10, and can transmit torque via the press-fitting fit-engagement surfaces, and hence the load applied to the welded portion 61 is small, thus making it possible to adopt a welding method relatively free from the influence of heat as described above.

Figure 11:
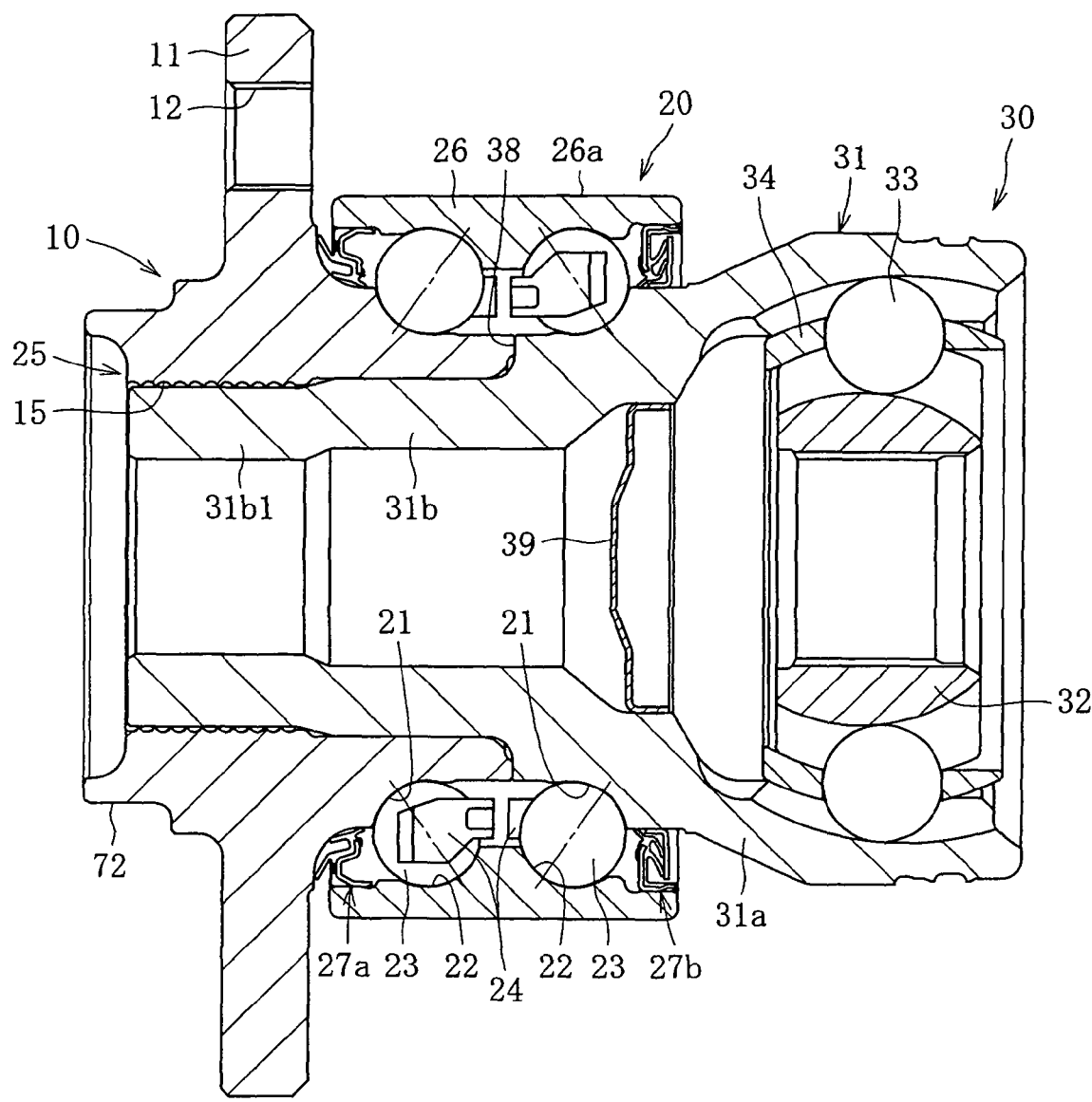
FIG. 11 A sectional view of a bearing unit for driving wheels.

While in the examples illustrated in FIGS. 11 through 13 the stem portion 31b is fit-engaged with the inner periphery of the hub 10, it is also possible to fit-engage the hub 10 with the inner periphery of the hollow stem portion 31b to connect them together in a non-separable manner (see FIGS. 14 through 17).

Figure 14:
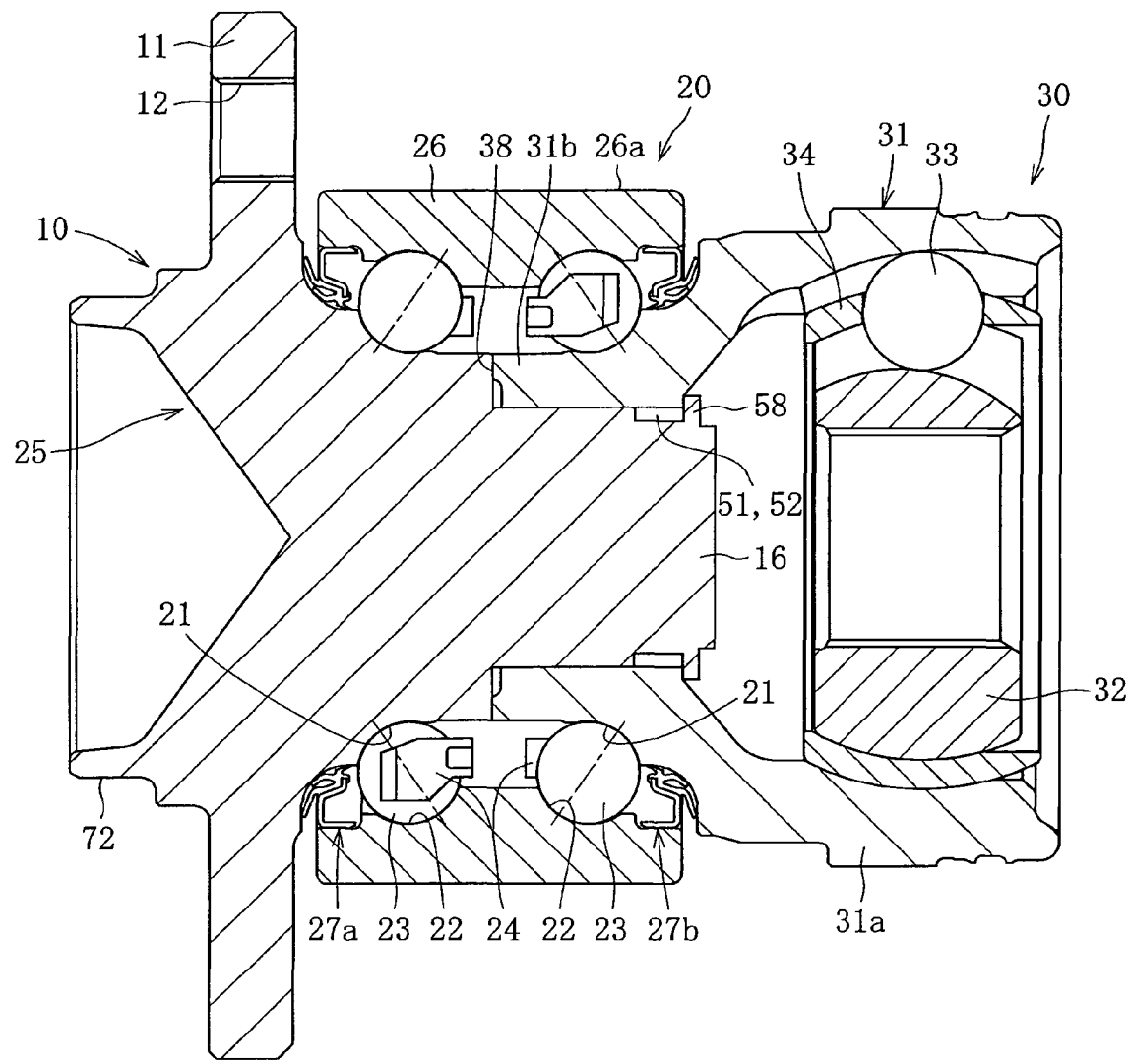
FIG. 14 A sectional view of a bearing unit for driving wheels.

Of those drawings, FIG. 14 illustrates a construction in which, as in the embodiment illustrated in FIG. 1, the male portion 51 and the female portion 52 are formed in different configurations and in which the male portion 51 is press-fitted into the female portion 52, whereby plastic joint is effected between the hub 10 and the outer joint member 31. In this case, the male portion 51 is formed on the outer peripheral surface of the in-board side solid end portion 16 of the hub 10, and the female portion 52 is formed on the inner peripheral surface of the stem portion 31b opposed thereto. As in the embodiment illustrated in FIG. 1, after the press-fitting of the male portion 51, the outer peripheral portion of the solid shaft end portion 16 of the hub 10 is caulked by the method illustrated in FIG. 9 to form a flange portion 58, thereby further enhancing the connection strength.

Figure 15:
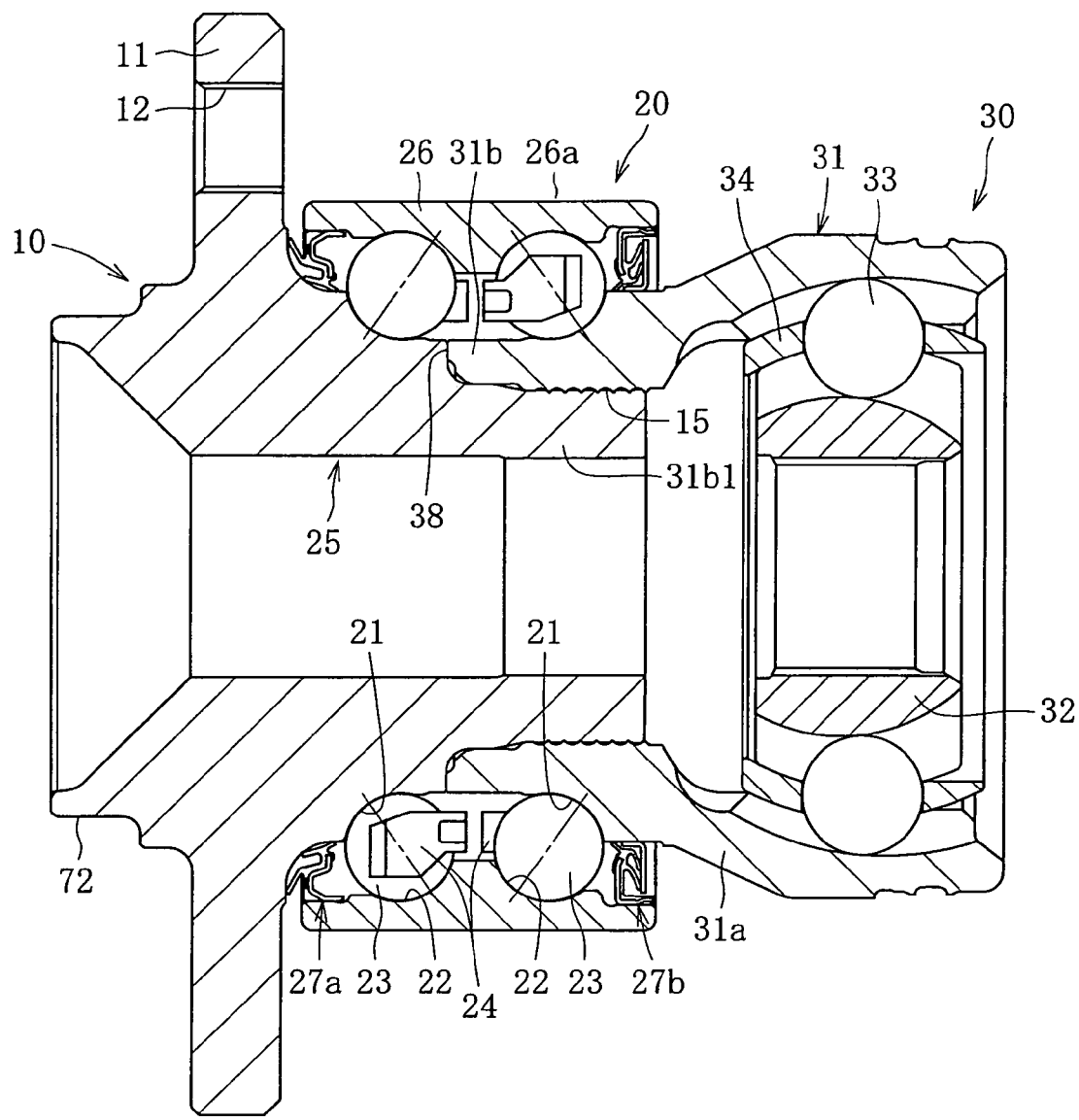
FIG. 15 A sectional view of a bearing unit for driving wheels.
Figure 16:
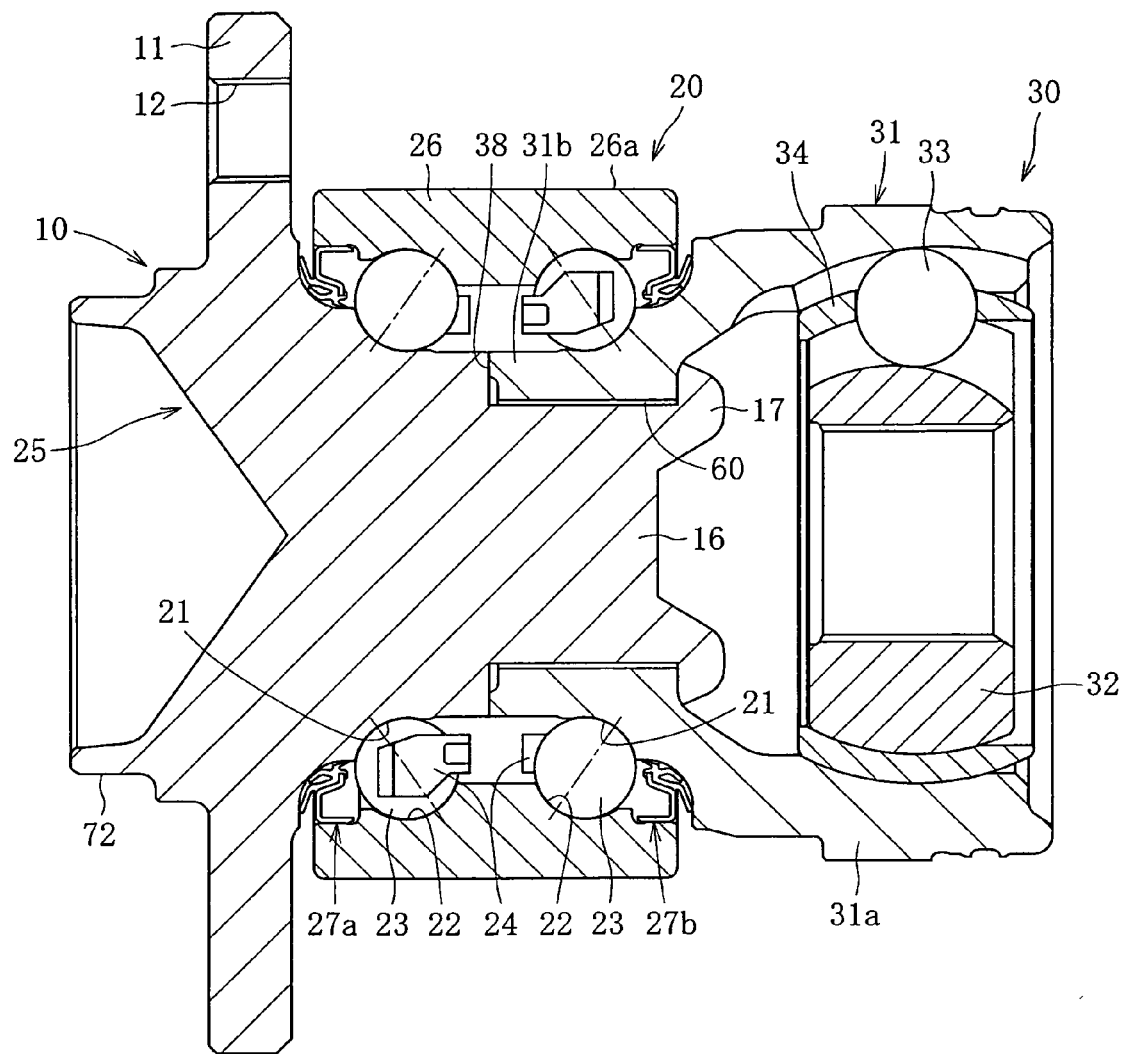
FIG. 16 A sectional view of a bearing unit for driving wheels.
Figure 17:
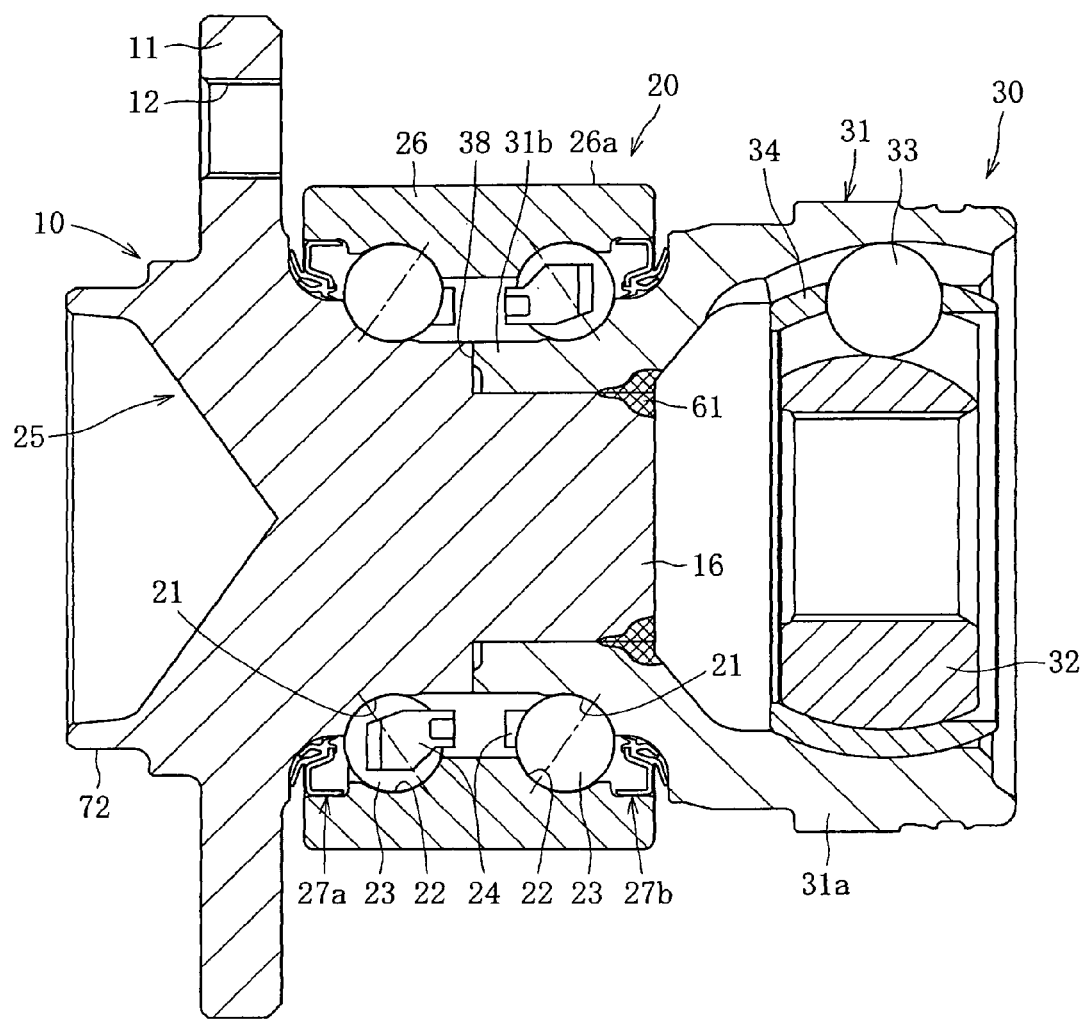
FIG. 17 A sectional view of a bearing unit for driving wheels.

FIG. 15 illustrates a construction in which plastic joint is effected between the hub 10 and the outer joint member 31 by the expansion caulking described above. That is, the small diameter portion 31b1 of the hollow hub 10 is caused to undergo divergent deformation by a mandrel, and the asperity portion 15 formed in the inner peripheral surface of the stem portion 31b is engaged therein, whereby plastic joint is effected between the hub 10 and the outer joint member 31. FIG. 16 illustrates a construction in which plastic joint is effected between the hub 10 and the outer joint member 31 by the orbital forming described above. A cylindrical portion formed at the in-board side solid shaft end 16 of the hub 10 is caused to undergo plastic deformation by orbital forming to form a flange 17, which is held in intimate contact with a mouth portion 31a. FIG. 17 illustrates a construction in which the flange 17 and the mouth portion 31a are connected together in a non-separable fashion by the above-mentioned welding method (numeral 61 indicates the welded portion).

Figure 2:
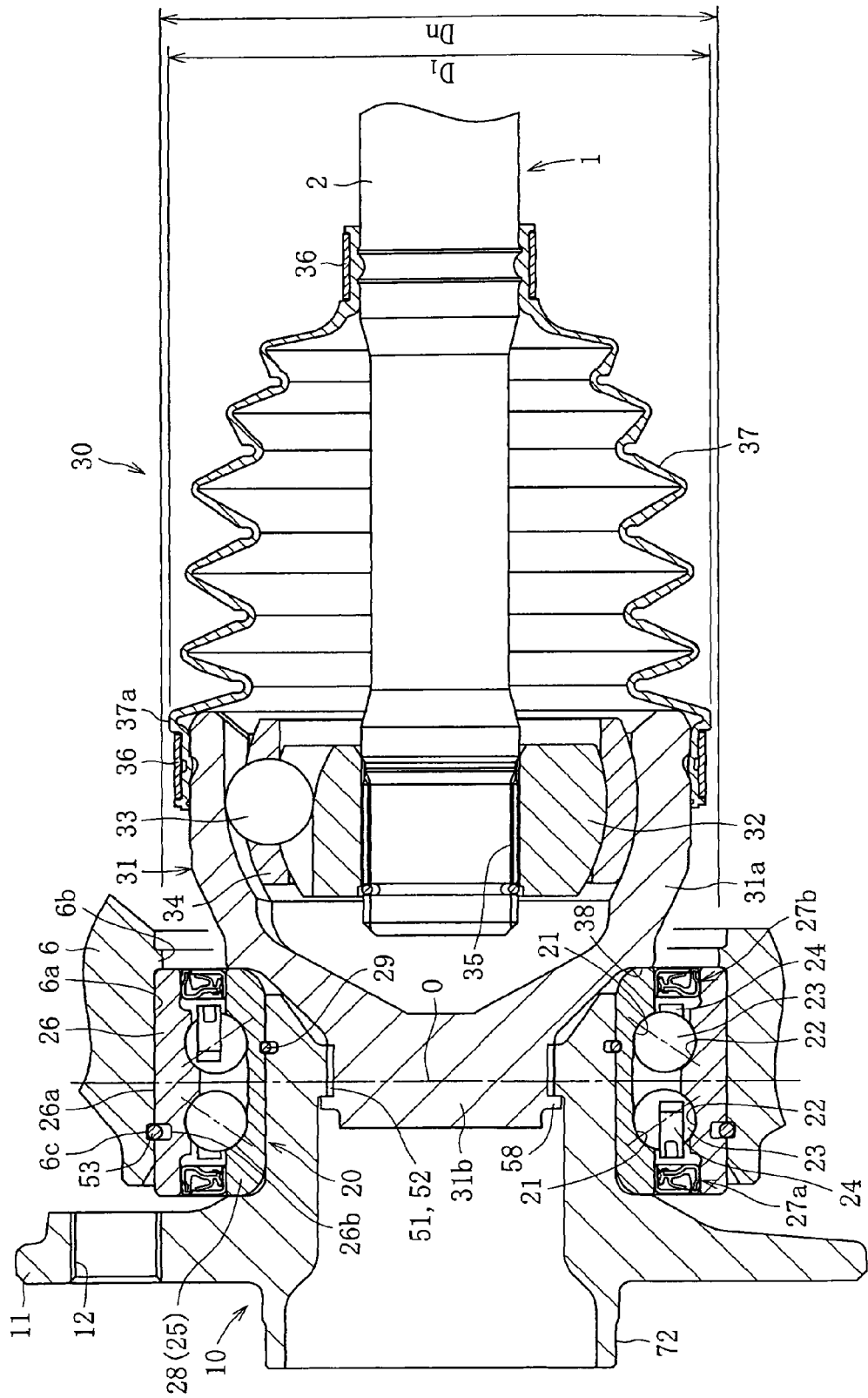
FIG. 2 A sectional view of a bearing unit for driving wheels.
Figure 3:
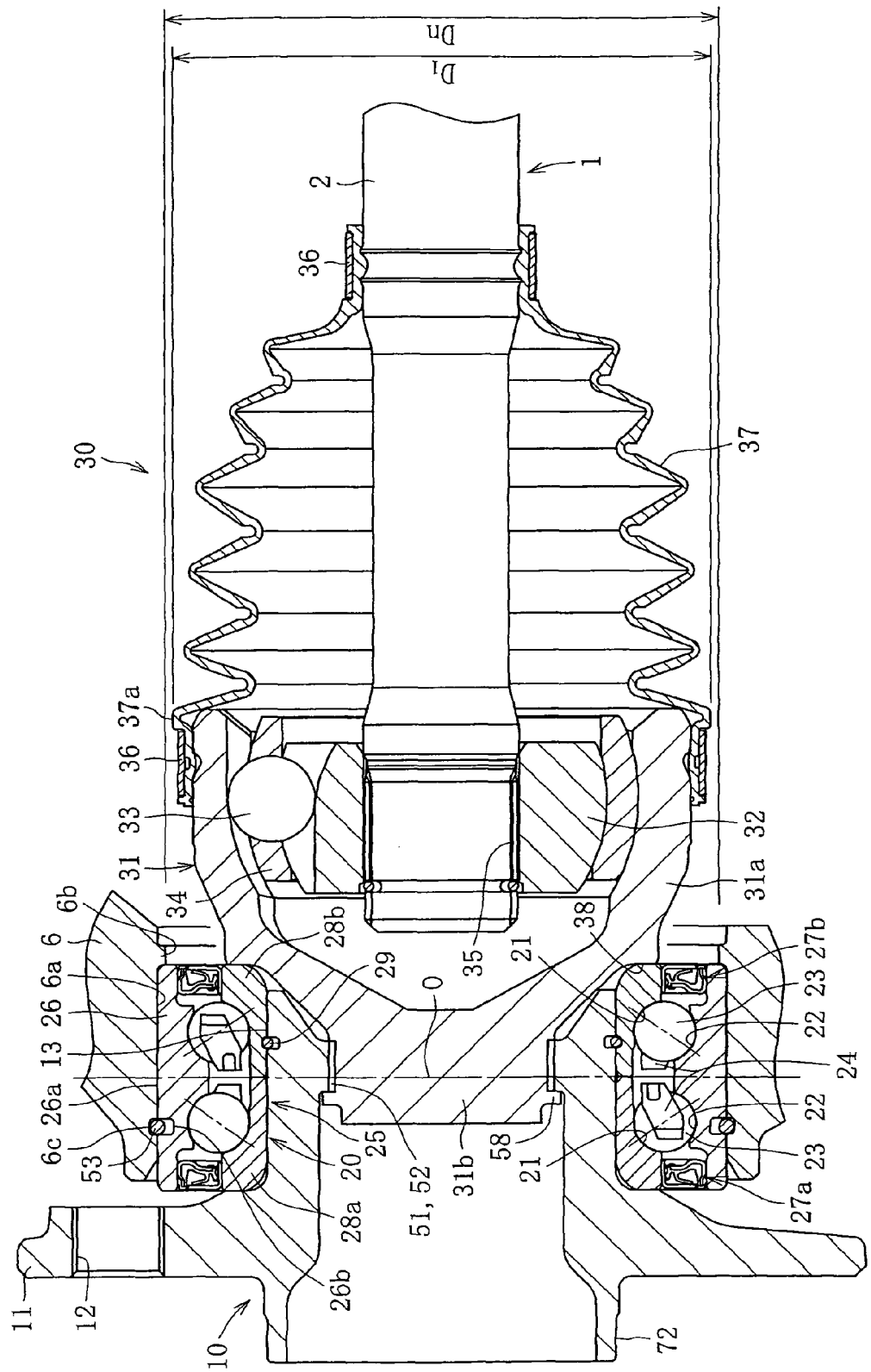
FIG. 3 A sectional view of a bearing unit for driving wheels.

FIGS. 2 and 3 illustrate other driving wheel bearing unit constructions. Of those, in the bearing unit illustrated in FIG. 2, both of the double-row inner races 21 of the bearing portion 20 are formed on the outer peripheral surface of the inner ring 28 of an integral structure, which is press-fitted into the outer periphery of the hub 10. In this case, the inner ring 28 constitutes the inner member 25 having the double-row inner races 21. FIG. 3 illustrates an example in which the inner ring 28 of the integral structure illustrated in FIG. 2 is axially divided into two portions, which are respectively press-fitted into the outer peripheral surface of the hub 10, with the inner race 21 being formed on the outer peripheral surface of each of the two inner rings 28a and 28b. With this construction, the two inner rings 28a and 28b constitute the inner member 25 having the double-row inner races 21. In both of the bearing units illustrated in FIGS. 2 and 3, the openings at both ends of the bearing portion 20 are sealed by cassette seals 27a and 27b.

Except for the points described above, the bearing units illustrated in FIGS. 2 and 3 are of the same construction as the bearing unit illustrated in FIG. 1, and hence the same members and elements are indicated by the same reference numerals, and a redundant description thereof is omitted.

Figure 18:
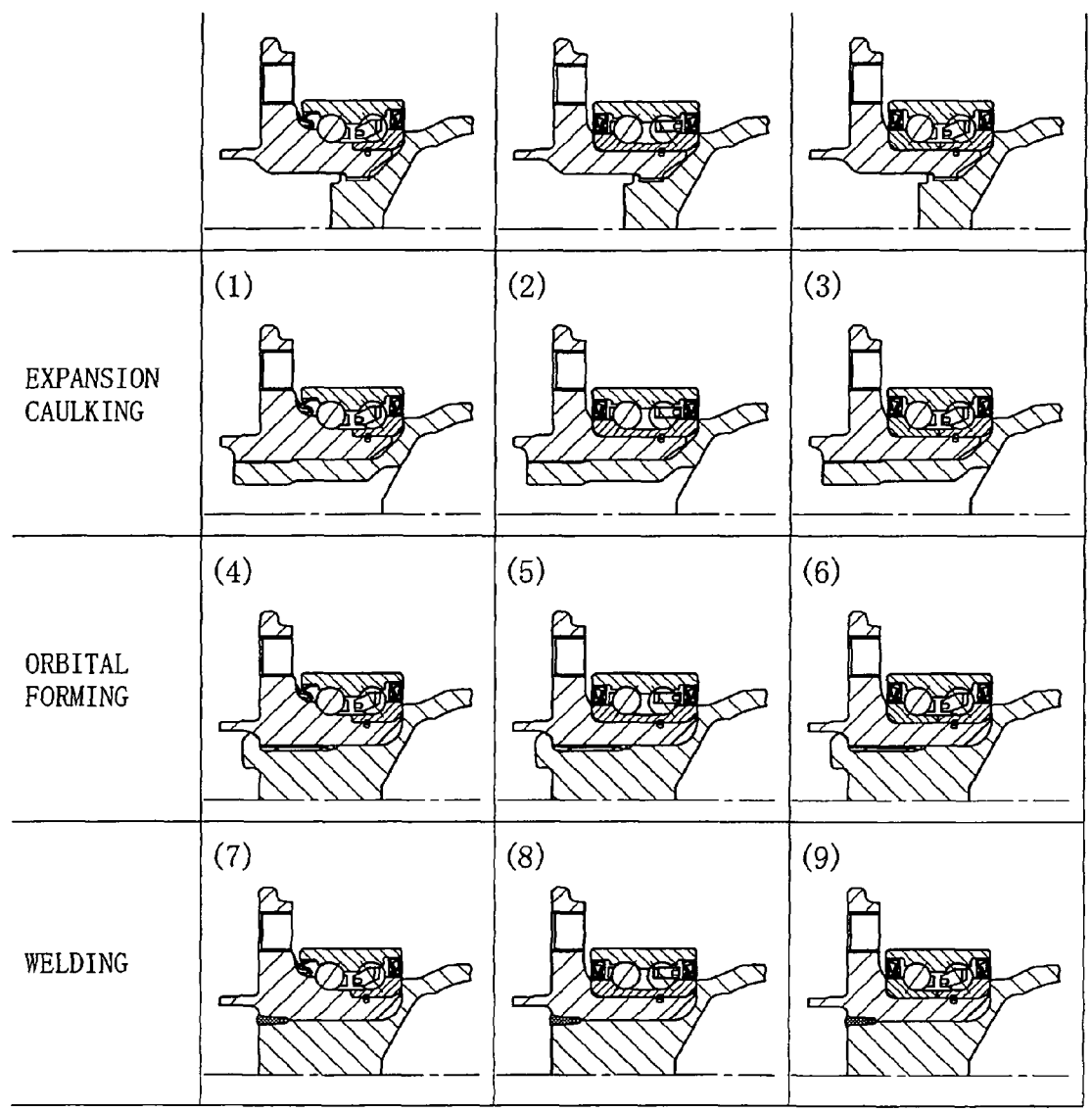
FIG. 18 A diagram illustrating how expansion caulking, orbital forming, and welding are applied to the bearing units illustrated in FIGS. 1 through 3.

FIG. 18 illustrates an example in which, in the bearing units illustrated in FIGS. 1 through 3, the hub 10 and the outer joint member 31 are connected together at the out-board side end by the various connection structures described above. Portions of FIG. 18 in the left-hand side column (indicated by numerals 1, 4, and 7) correspond to the bearing unit illustrated in FIG. 1, portions in the middle column (indicated by numerals 2, 5, and 8) correspond to the bearing unit illustrated in FIG. 2, and portions in the right-hand side column (indicated by numerals 3, 6, and 9) correspond to the bearing unit illustrated in FIG. 3. Portions of the drawing in the upper row (indicated by numerals 1 through 3) illustrate an example to which expansion caulking is applied, portions in the middle row (indicated by numerals 4 through 6) illustrate an example to which orbital forming is applied, and portions in the lower row (indicated by numerals 7 through 9) illustrate an example to which welding is applied.

Figure 10:
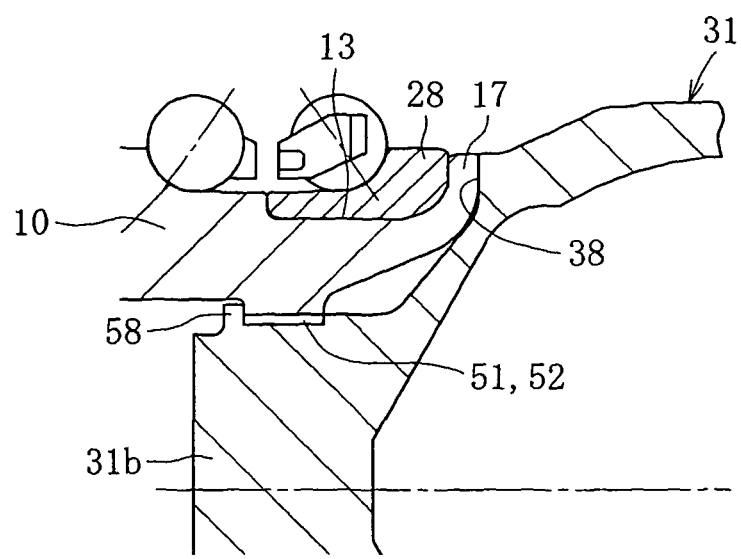
FIG. 10 A sectional view of a bearing unit for driving wheels.

In the constructions illustrated in FIGS. 1 through 3, the positioning of the hub 10 and the inner ring 28, 28a, 28b is effected by the snap ring 29. Instead, it is also possible to effect positioning on both by orbital forming. FIG. 10 illustrates an example thereof, in which the cylindrical shaft end portion of the small diameter step portion 13 of the hub 10 extends beyond the in-board side end surface of the inner ring 28, and a forming tool is oscillated on the inner side of the protruding portion thereof, whereby the protruding portion is caused to undergo outward plastic deformation to form the flange 17. The flange 17 is in intimate contact with the in-board side end surface of the inner ring 28. Also in the bearing units illustrated in FIGS. 2 and 3, it is possible to effect axial positioning on the hub 10 and the inner ring 28, 28a, 28b by performing orbital forming to form the flange 17.

Figure 19:
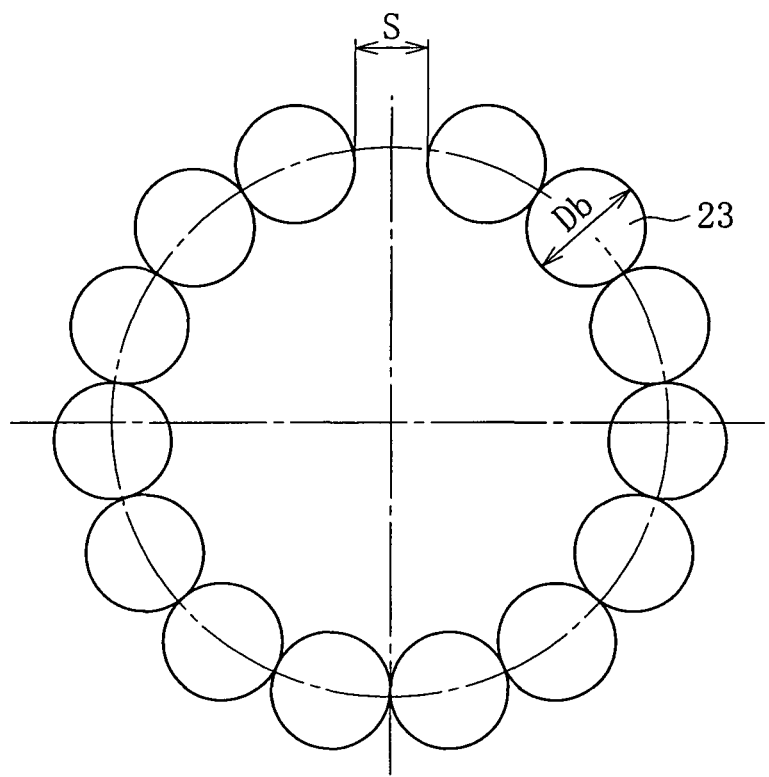
FIG. 19 A front view of a full-complement bearing structure.

While in the bearing portion 20 of each of the embodiments described above, the rolling elements 23 are retained by the cage 24, it is also possible to adopt a full-complement-bearing form using no cage as illustrated in FIG. 19. As compared with the case in which a cage is used, in the full-complement-bearing form, the number of rolling elements which are allowed to be incorporated increases, and hence it is possible to reduce the load on each rolling element. Thus, even under a high load condition, it is possible to achieve an improvement in terms of the service life of the bearing unit. In a case in which there is a difference in load between the in-board side rolling element row and the out-board side rolling element row, the full-complement-bearing form can only be adopted on the higher load side. Of course, when the both sides of the rolling element rows are under substantially the same load condition, the full-complement-bearing form may be adopted for both sides. Usually, the in-board side moment load is larger, and hence the full-complement-bearing form is adopted for the in-board side rolling element row.

In the case of the full-complement-bearing form, when the circumferential gap between the rolling elements is too large, the rolling elements may collide with each other violently to cause noise and heat generation, and hence it is desirable for the total gap S between the rolling elements to be made smaller than the diameter dimension Db of the rolling elements 23 (In particular, in the case in which balls are used as the rolling elements, the total gap S is set to be approximately 40% or less of the ball diameter).

Figure 20:
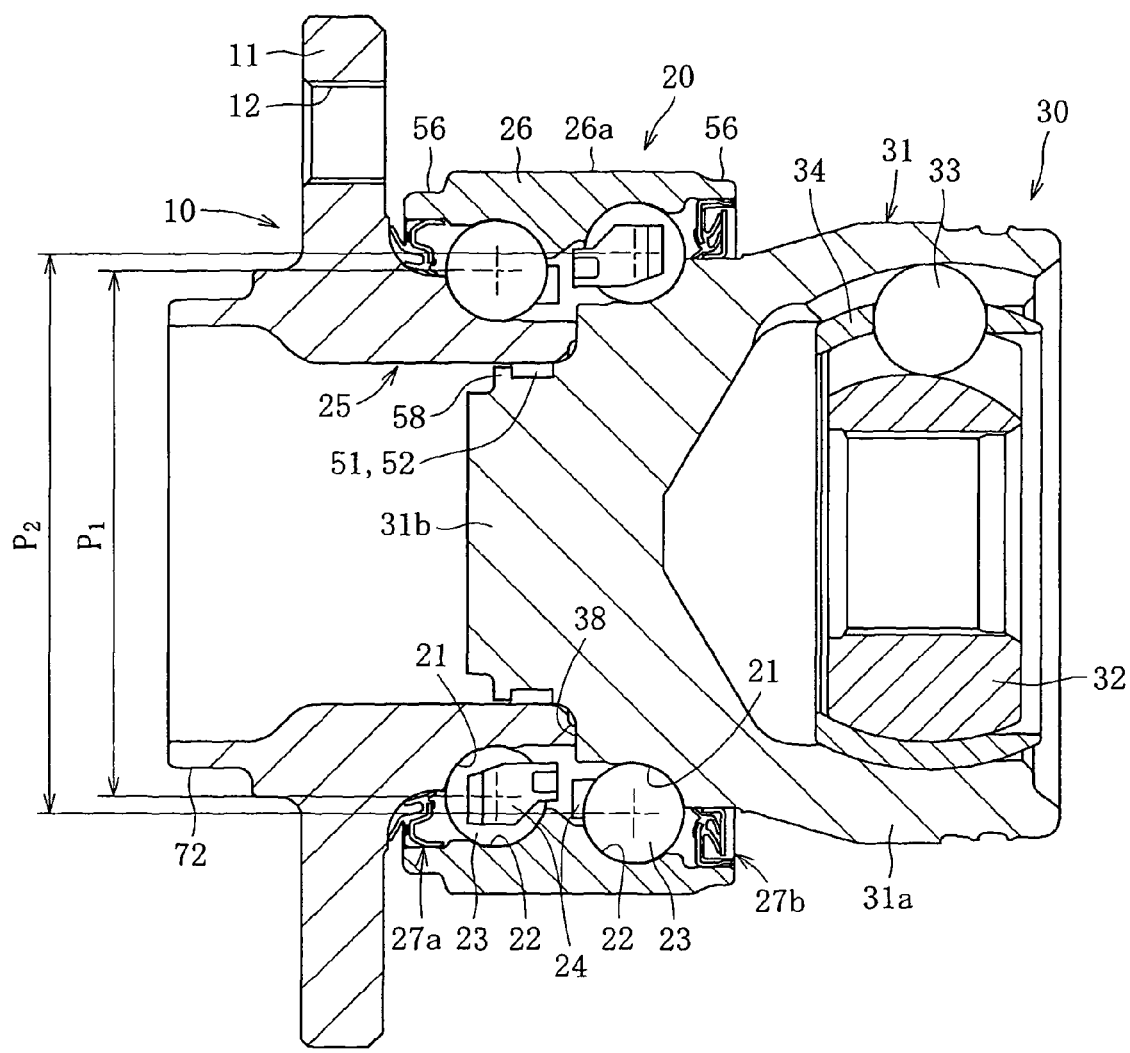
FIG. 20 A sectional view of a bearing unit for driving wheels endowed with a difference in rolling element PCD.
Figure 21:
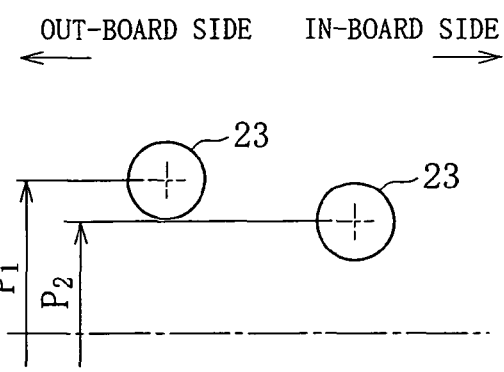
FIG. 21 A schematic side view of rolling elements differing in PCD.
Figure 22A:
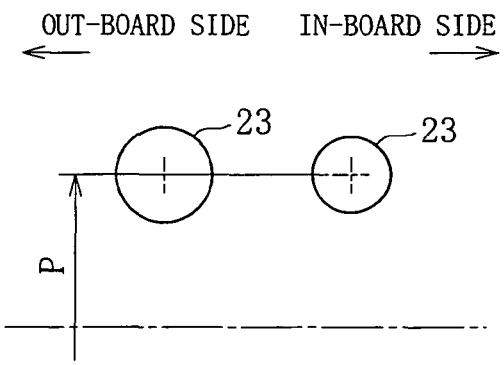
FIG. 22a A schematic side view of rolling elements differing in diameter.
Figure 22B:
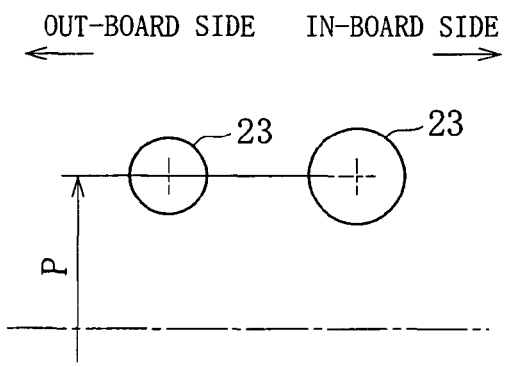
FIG. 22b A schematic side view of rolling elements differing in diameter.

As illustrated in FIG. 20, also in the bearing type using the cage 24, an enhancement in rigidity and an improvement in service life are to be expected by providing a difference between the PCD (P1) of the out-board side rolling element row and the PCD (P2) of the in-board side rolling element row. This is due, for example, to the fact that an increase in one PCD allows an increase in the bearing span (distance between the intersections of the axis and the lines of action in the application direction of a force applied to the race surfaces) without involving any increase in the axial dimension of the bearing unit, and that the number of rolling elements allowed to be incorporated increases. While the example illustrated in FIG. 20 exemplifies the case in which the PCD (P2) of the in-board side rolling element row is increased, it is also possible to increase the PCD (P1) of the out-board side rolling element row as illustrated in FIG. 21. Further, when the design of the in-board side cage 24 differs from that of the out-board side cage 24, the same effect can be obtained even if a larger number of rolling elements are incorporated into one cage 24 than in the other cage. Further, as illustrated in FIGS. 22a and 22b, the same effect can be obtained by making the diameter of the in-board side rolling elements 23 different from that of the out-board side rolling elements 23.

Figure 23:
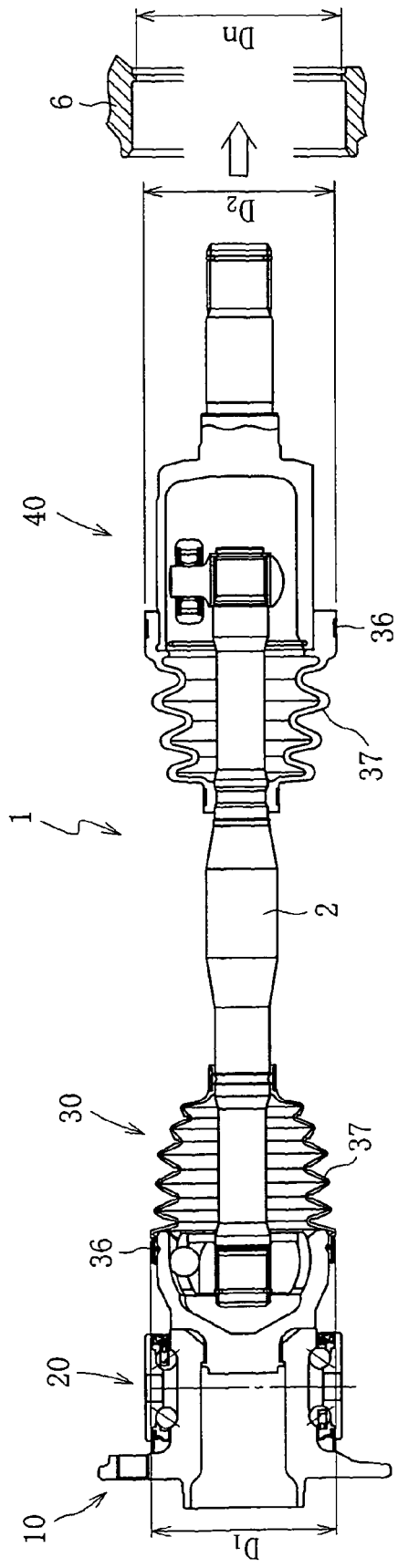
FIG. 23 A sectional view of a drive shaft assembly.

FIG. 23 illustrates a drive shaft assembly according to another embodiment.

Figure 24:
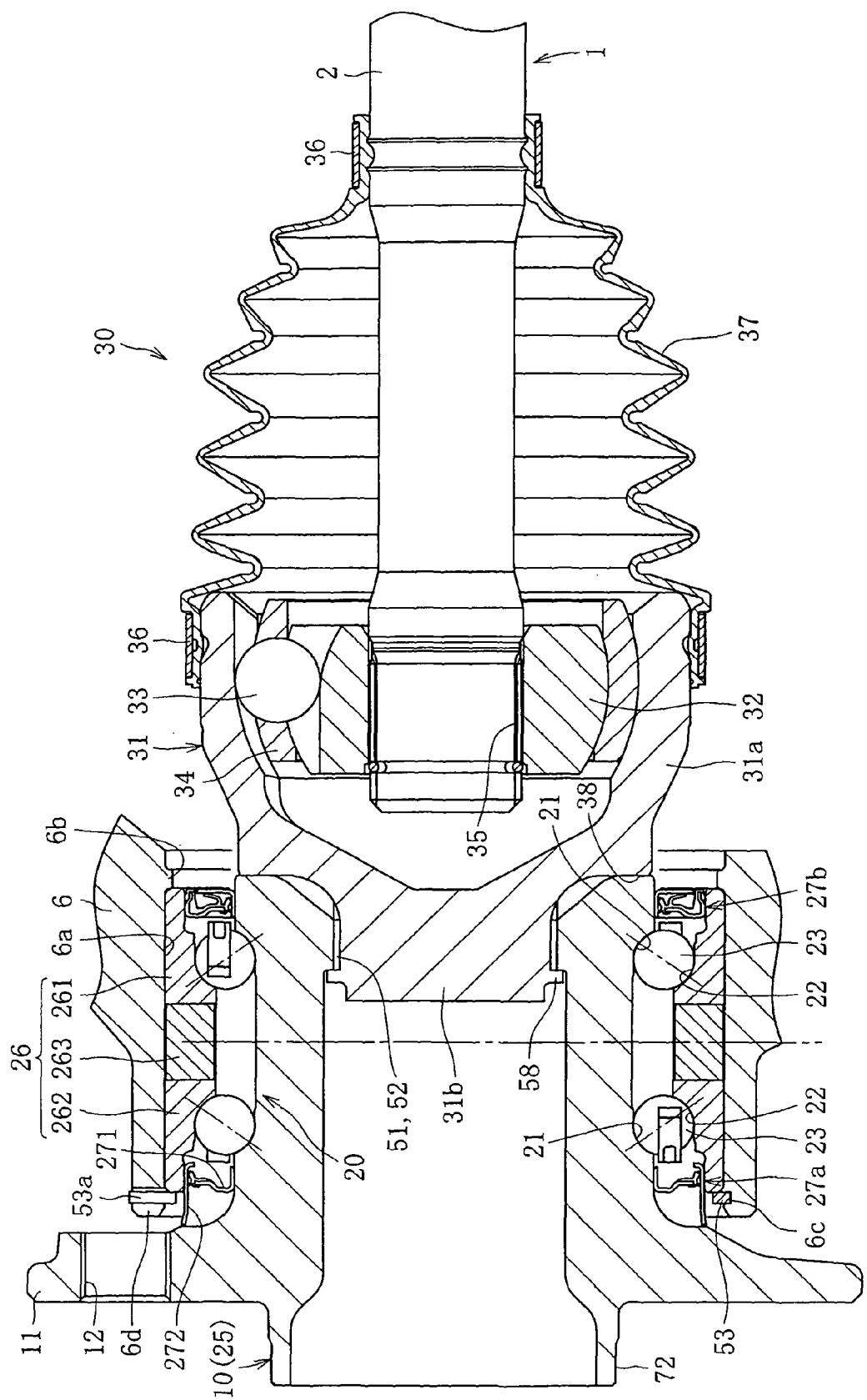
FIG. 24 A sectional view of a bearing unit for driving wheels.

As illustrated in FIG. 24, in the bearing unit of this drive shaft assembly, the outer member 26 includes a pair of bearing outer rings 261 and 262 and a ring-like spacer 263 arranged between the bearing outer rings 261 and 262. The outer races 22 are respectively formed on the inner peripheral surfaces of both the bearing outer rings 261 and 262. The double-row inner races 21 are directly formed on the outer peripheral surface of the hub 10, with the hub 10 constituting the inner member 25. While in the example illustrated in the drawing the in-board side end surface of the hub 10 is held in contact with the shoulder surface 38 of the outer joint member 31, it is also possible to interpose a gap therebetween.

Of the seals 27 for sealing the openings at both ends of the bearing portion 20, the out-board side seal 27a includes a core 271 whose outer ends are covered with an elastic material such as rubber to form a plurality of (e.g., two) seal lips and a slinger 272 in contact with the seal lips. The core 271 is press-fitted and fixed in the outer peripheral surface of the hub 10, and the slinger 272 is press-fitted and fixed in the inner peripheral surface of the out-board side bearing outer ring 262. The out-board side end portion of the slinger 272 is in close proximity to the in-board side end surface of the flange 11 to constitute a labyrinth seal.

Figure 26:
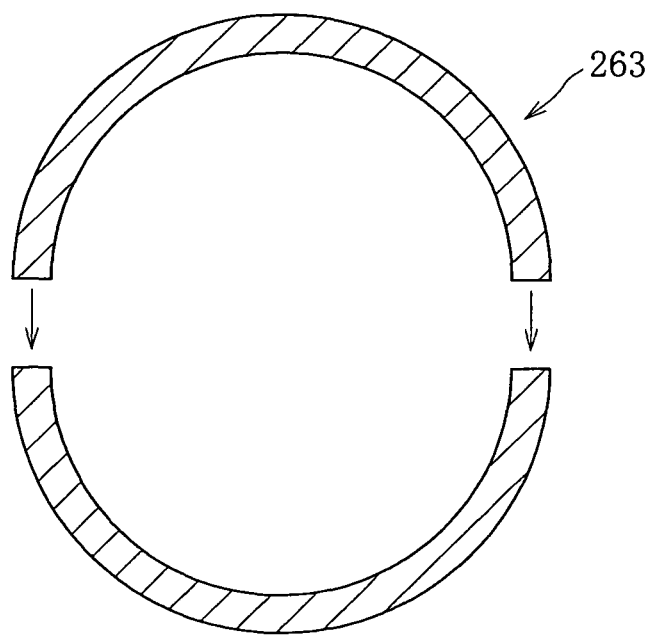
FIG. 26 A sectional view of a spacer.

The outer peripheral surfaces of the bearing outer rings 261 and 262 and the spacer 263 are all cylindrical surfaces. The cylindrical outer peripheral surfaces of the bearing outer rings 261 and 262 are press-fitted into the inner peripheral surface 6a of the knuckle member 6, whereas the outer diameter dimension of the spacer 263 is slightly smaller than that of the bearing outer rings 261 and 262, and a slight gap exists between the spacer and the inner peripheral surface of the knuckle member 6. As illustrated in FIG. 26, the spacer 263 is circumferentially divided into two portions.

Figure 25:
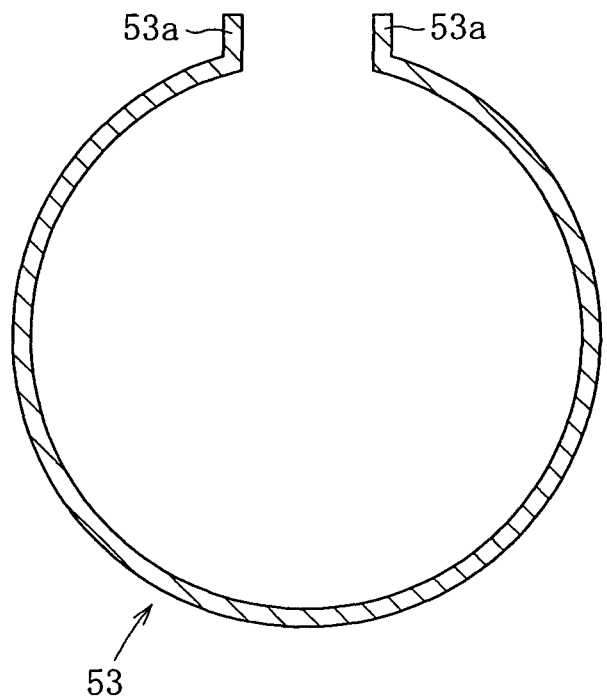
FIG. 25 A sectional view of a snap ring.

Positioning of the out-board side bearing outer ring 262 is effected by the snap ring 53. As illustrated in FIG. 25, it is possible to use, as the snap ring 53, a C-shaped snap ring including at both circumferential ends thereof operating portions 53a extending outwardly. The snap ring 53 is fitted into the snap ring groove 6c formed in the inner peripheral surface of the knuckle member 6, and the operating portions 53a are accommodated in an axial cutout 6d formed in the knuckle member 6, whereby the snap ring 53 is engaged with the out-board side end surface of the bearing outer ring 262 to effect positioning on the outer member.

The assembly of this bearing unit is assembled by the following procedures.

Figure 27:
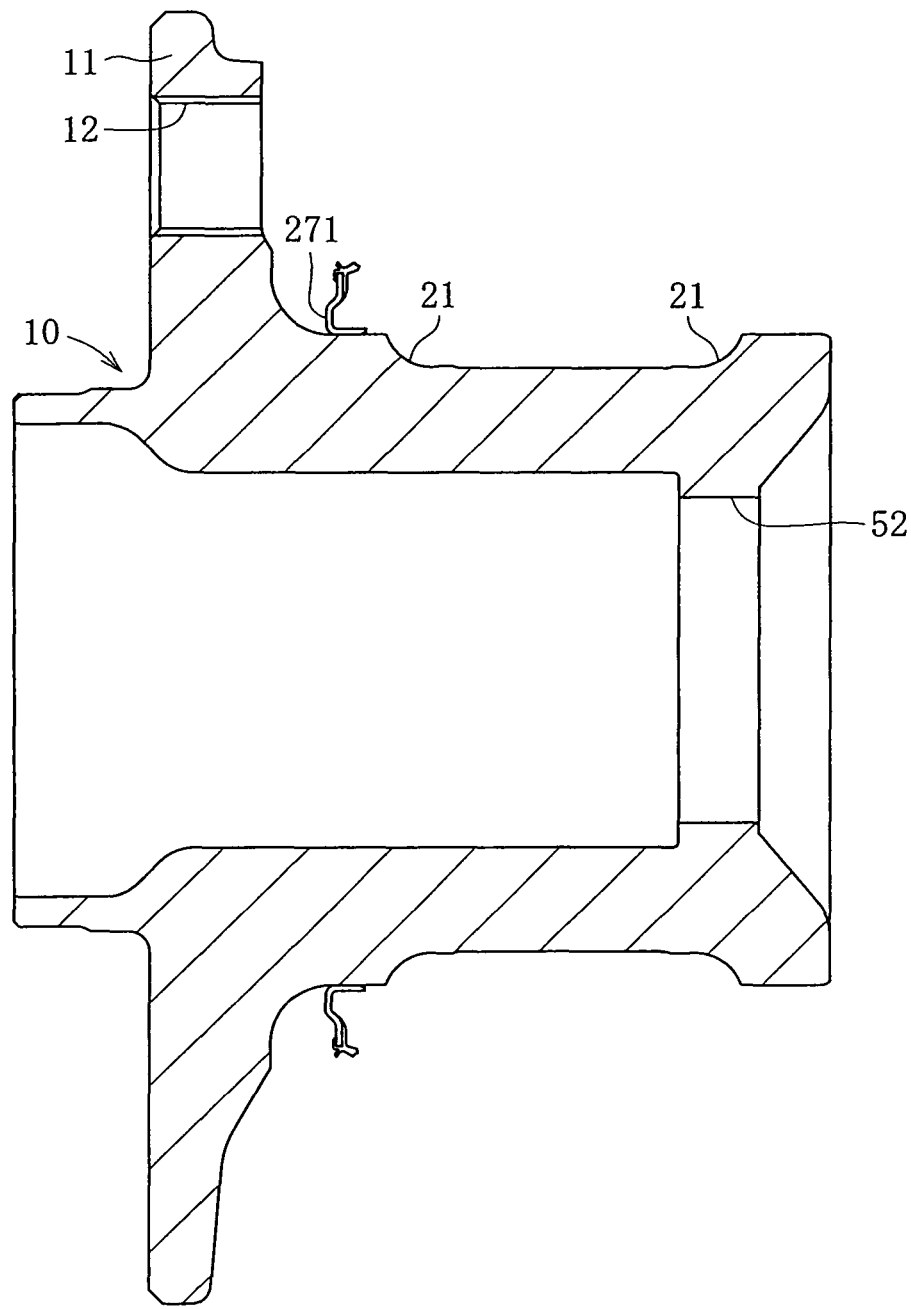
FIG. 27 A sectional view illustrating an assembly process for a bearing unit for driving wheels.

First, as illustrated in FIG. 27, the core 271 of the out-board side seal 27a is press-fitted and fixed in the outer periphery of the hub 10.

Figure 28:
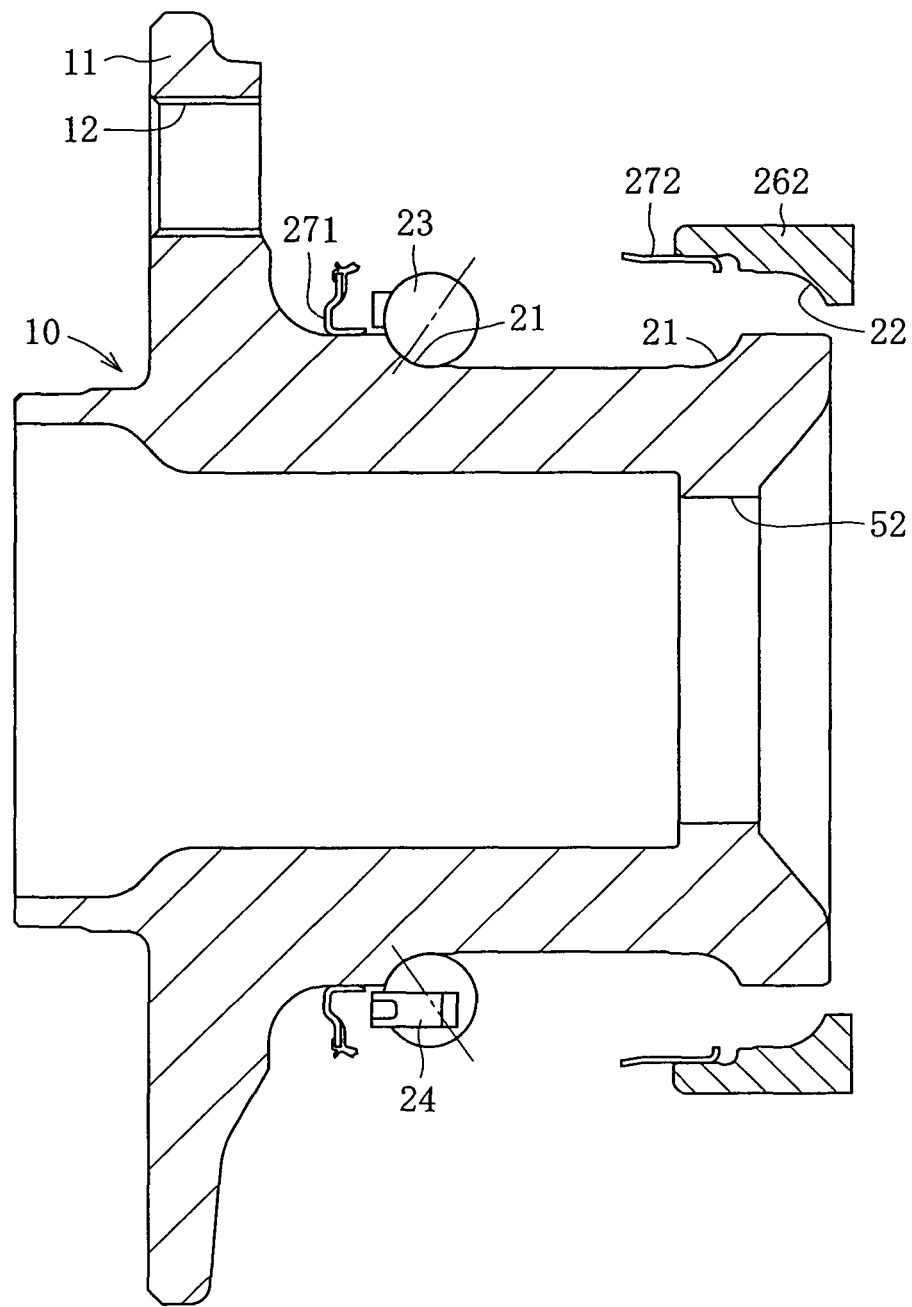
FIG. 28 A sectional view illustrating an assembly process for a bearing unit for driving wheels.

Next, as illustrated in FIG. 28, the rolling elements 23 are incorporated into the outer periphery of the hub 10 and accommodated in the inner race 21. In this process, the rolling elements 23 are previously accommodated in the pocket of the cage 24, and in this state, the rolling elements 23 are incorporated into the outer periphery of the hub 10. Then, the out-board side bearing outer ring 262 is inserted into the outer periphery of the hub 10. In this process, the slinger 272 is previously press-fitted into the inner peripheral surface of the bearing outer ring 262. When the bearing outer ring 262 is pushed toward the out-board side, the seal lip formed on the core 271 is brought into contact with the inner peripheral surface of the slinger 272, thereby forming the seal 27a. Further, the rolling elements 23 are accommodated in the outer race 22 of the bearing outer ring 262.

Figure 29:
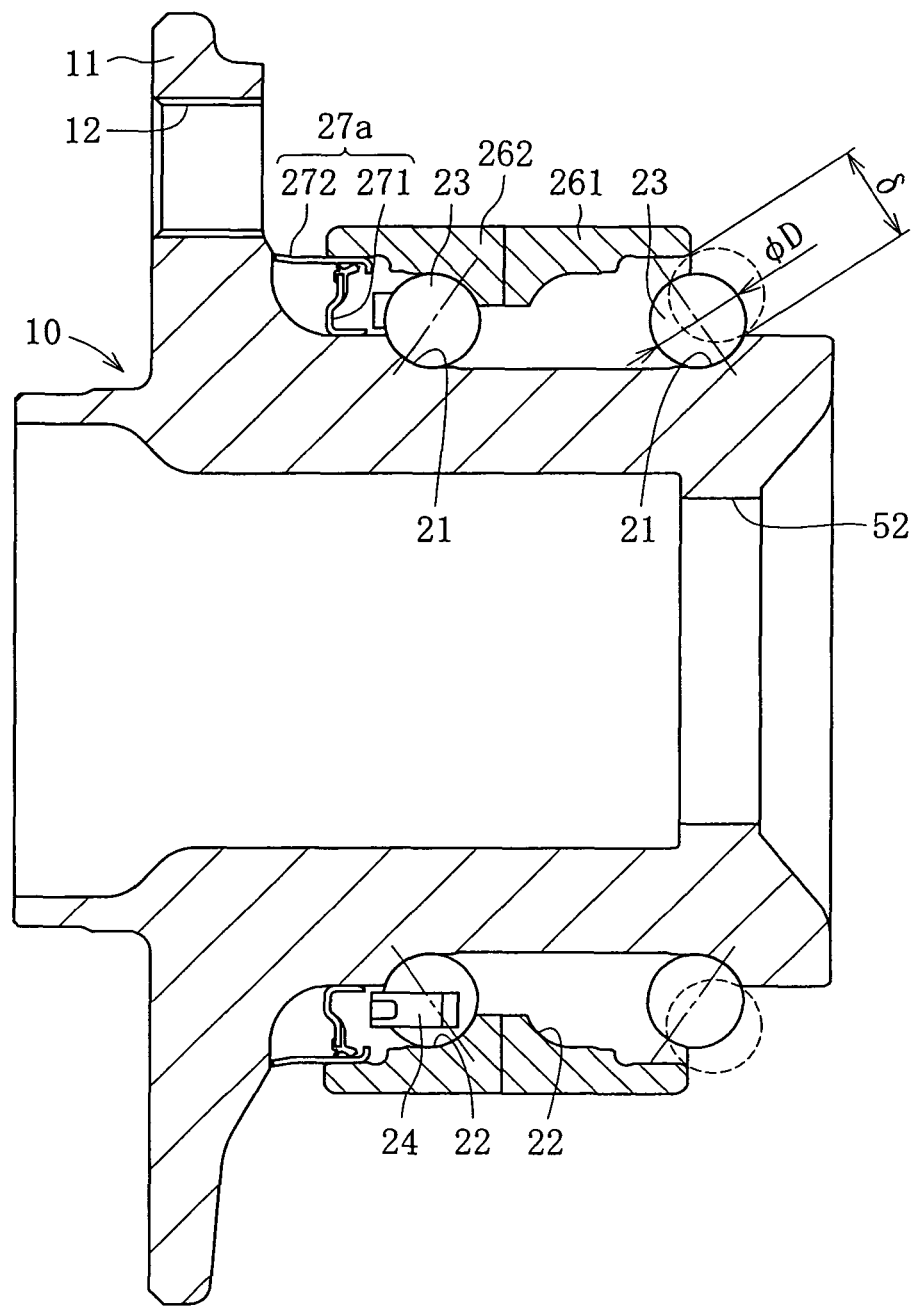
FIG. 29 A sectional view illustrating an assembly process for a bearing unit for driving wheels.

Next, as illustrated in FIG. 29, the in-board side bearing outer ring 261 is inserted into the outer periphery of the hub 10. In this process, the bearing outer ring 261 is situated on the out-board side of a predetermined position by, for example, bringing it into contact with the out-board side bearing outer ring 262, whereby a gap δ larger than the ball diameter D is formed between the in-board side end portion of the bearing outer ring 261 and the hub 10, and hence the rolling elements 23 are inserted into the space between the bearing outer ring 261 and the hub 10 through the gap δ. When a predetermined number of rolling elements 23 have been inserted thereto, the cage 24 is forced in through the in-board side opening, and the rolling elements 23 are accommodated in its pocket, thus retaining the rolling elements 23 at equal circumferential intervals.

Figure 30:
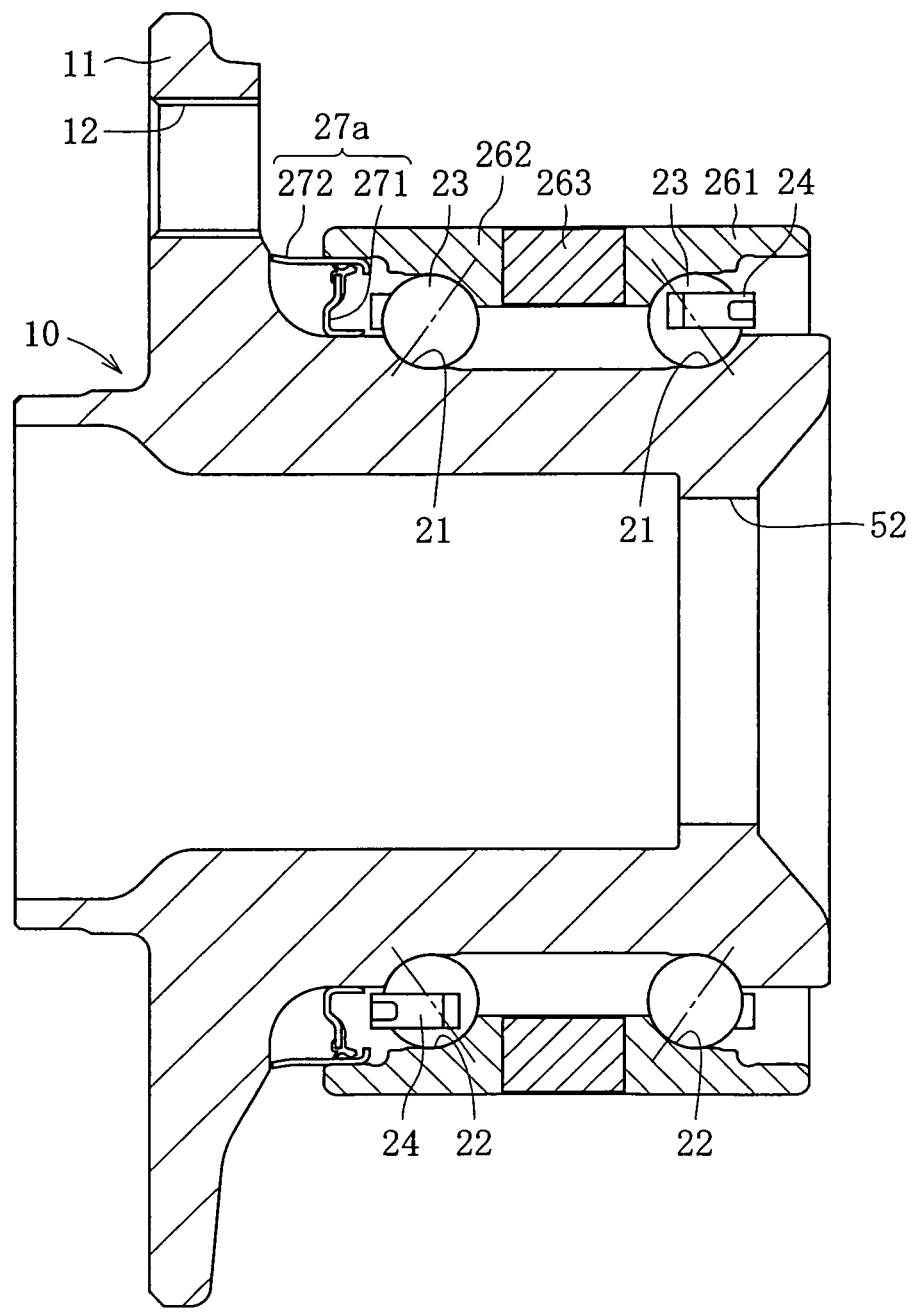
FIG. 30 A sectional view illustrating an assembly process for a bearing unit for driving wheels.

Next, as illustrated in FIG. 30, a gap is formed between the bearing outer rings 261 and 262 and the division spacer 263 is inserted into the gap so as to sandwich the hub 10. As a result, the in-board side bearing outer ring 261 is arranged at the predetermined position, and the in-board side rolling elements 23 are accommodated in the inner races 21 and the outer races 22 at a predetermined contact angle.

Figure 31:
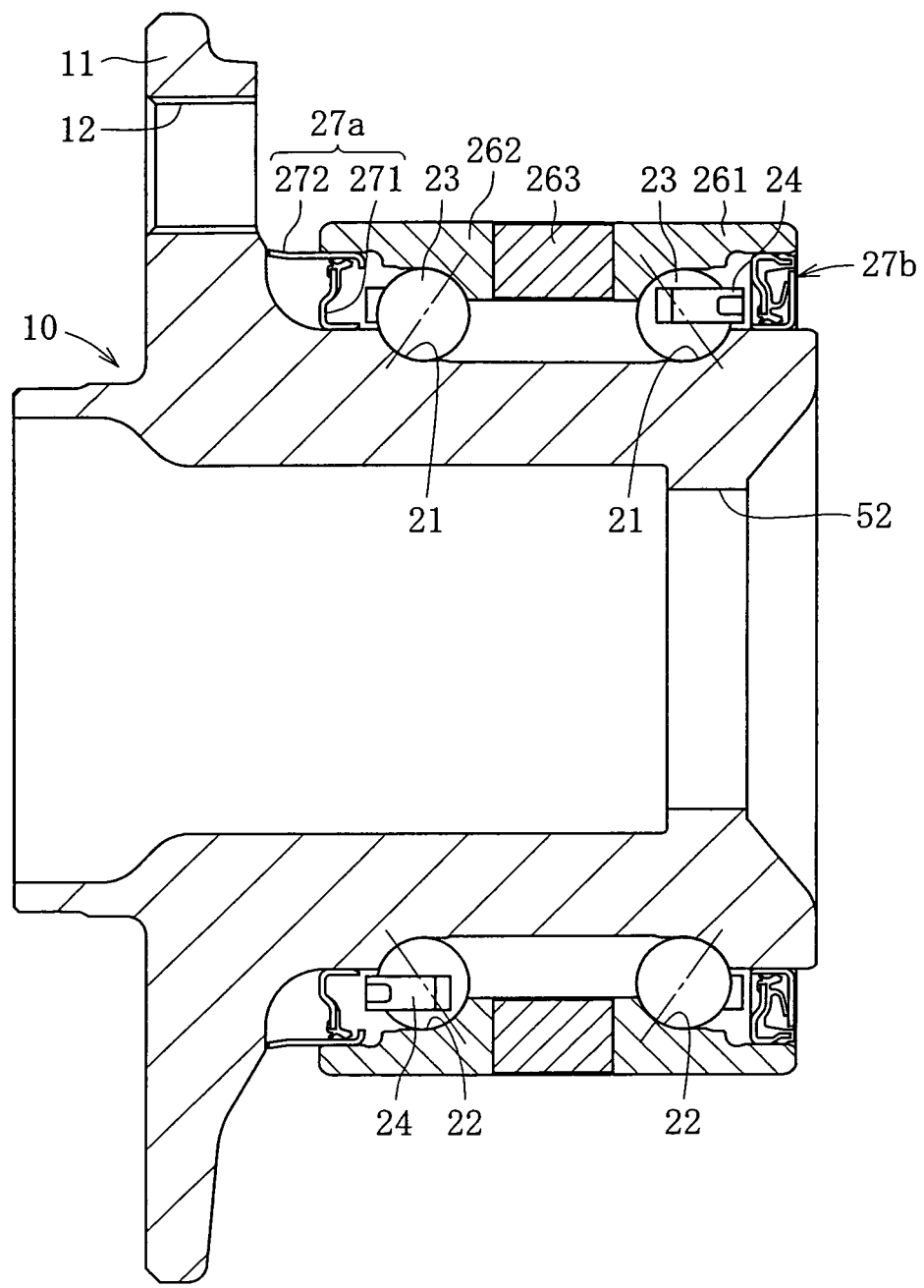
FIG. 31 A sectional view illustrating an assembly process for a bearing unit for driving wheels.

After this, as illustrated in FIG. 31, the cassette seal is press-fitted into the opening between the in-board side bearing outer ring 261 and the hub 10 to thereby form the seal 27b.

When the above-mentioned assembly has been completed, the hub 10 is connected in a non-separable manner with the outer joint member 31 of the out-board side constant velocity universal joint 30. In this regard, it is possible to adopt an arbitrary connection method. As in the case of the bearing units illustrated in FIGS. 1 through 3, the connection can be effected through plastic joint by press-fitting the male portion 51 into the female portion 52, and through expansion caulking, orbital forming, welding, etc. After this, the in-board side constant velocity universal joint 40, the intermediate shaft 2, and the out-board side constant velocity universal joint 30 are inserted in that order into the inner periphery of the knuckle member 6, and finally, the outer member 26 is press-fitted while expanding the snap ring 53 to bring the in-board side bearing outer ring 261 into contact with the protrusion 6b. After this, the snap ring 53 is elastically reduced in diameter and is engaged with the out-board side end surface of the bearing outer ring 262, whereby the mounting of the drive shaft assembly is completed.

In the above-mentioned construction, the spacer 263 allowing insertion afterwards is arranged between the pair of bearing outer rings 261 and 262, and hence even in the case in which the inner races 21 are directly formed on the hub 10, it is possible to incorporate double-row rolling elements 23 into the space between the outer member 26 and the hub 10. Thus, there is no need to provide each inner ring 28, 28a, 28b as illustrated in FIGS. 1 through 3, making it possible to achieve a reduction in cost through a reduction in the number of components.

As illustrated in FIG. 24, in this embodiment, there is used the snap ring 53 engaged with the out-board side end surface of the bearing outer ring 262. Apart from this, as illustrated in FIGS. 1 through 3, it is also possible to use the snap ring 53 interposed between the outer peripheral surface of the out-board side bearing outer ring 262 and the inner peripheral surface 6a of the knuckle member 6. Further, if there is involved no particular problem in terms of incorporation property, it is possible to use, as the out-board side seal 27a, the type of seal in which, as in the case of the seal 27a illustrated in FIG. 1, a seal lip is provided at the inner end of the core, and in which the outer peripheral surface of the core is press-fitted into the inner peripheral surface of the outer member 26.

Figure 32:
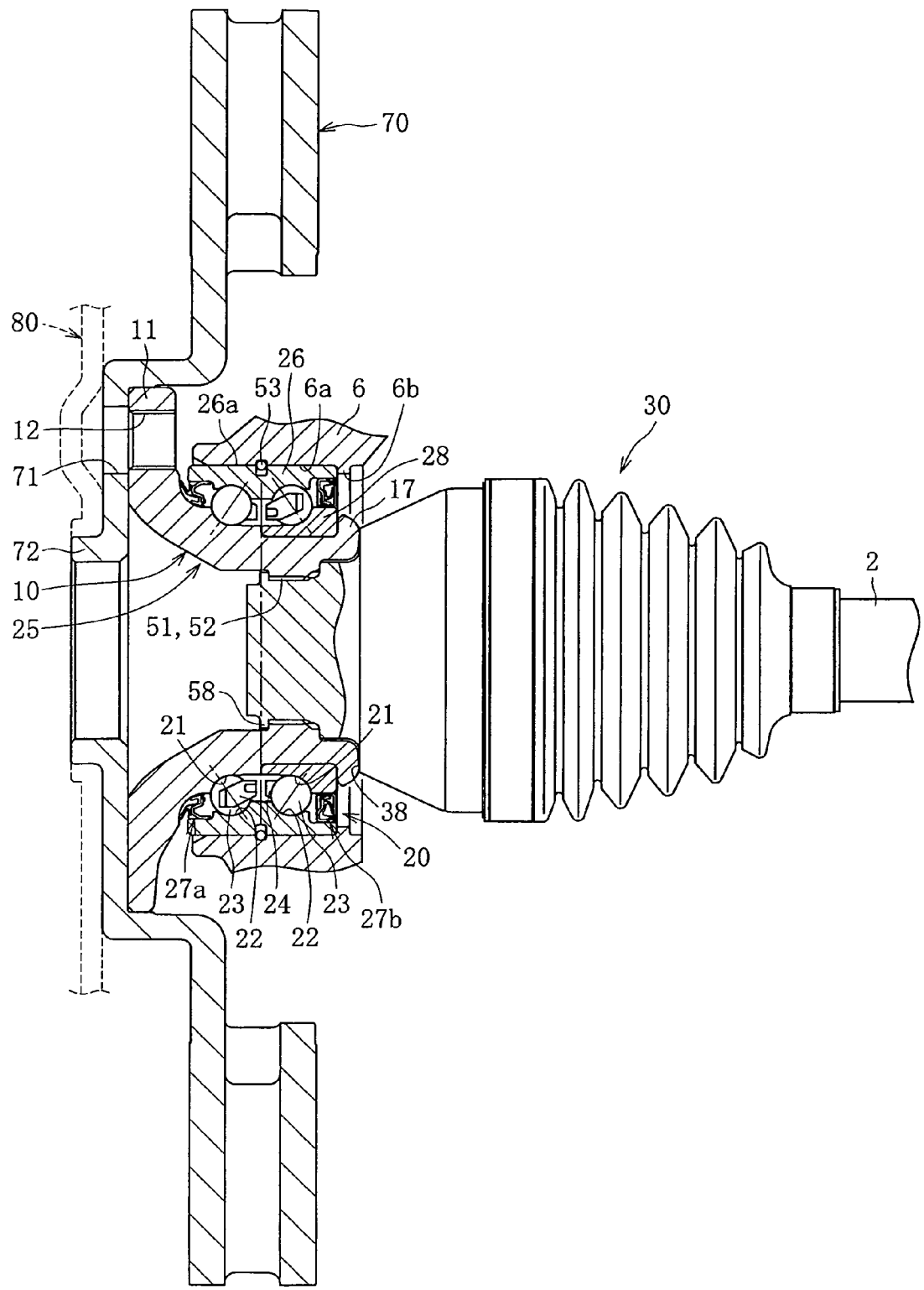
FIG. 32 A sectional view of a bearing unit for driving wheels.

FIG. 32 illustrates another embodiment of the present invention. In this driving wheel bearing unit, a cylindrical pilot portion 72 fit-engaged with the inner periphery of a wheel 80 is provided on a member separate from the hub 10, for example, a brake rotor 70. The brake rotor 70 is arranged between the out-board side end surface of the flange 11 of the hub 10 and the wheel 80, and includes, at a plurality of circumferential positions thereof, holes 71 through which wheel bolts are to be passed.

As illustrated in FIGS. 1 through 3, the pilot portion 72 is usually formed integrally at the out-board side end of the hub 10, which leads to a rather complicated configuration of the hub 10. Thus, actually, it is rather difficult to form the hub 10 by forging alone, and turning is often added thereto. Further, the pilot portion 72 partially requires rust prevention coating. Thus, the production cost of the hub 10 tends to be rather high.

In contrast, when the pilot portion 72 of the hub 10 is omitted, and is, instead, provided integrally, for example, with the inner end portion of the brake rotor as illustrated in FIG. 32, the configuration of the out-board side portion of the hub 10 is simplified, and hence it is possible to form the hub 10 by forming. Further, there is no need to provide rust prevention coating on the hub 10. Thus, it is possible to achieve a reduction in the cost of the hub 10 and to design the hub 10 in a smaller weight. Usually, the brake rotor 70 is formed by casting, and hence the brake rotor 70 including the pilot portion 72 can be produced at low cost.

Figure 33:
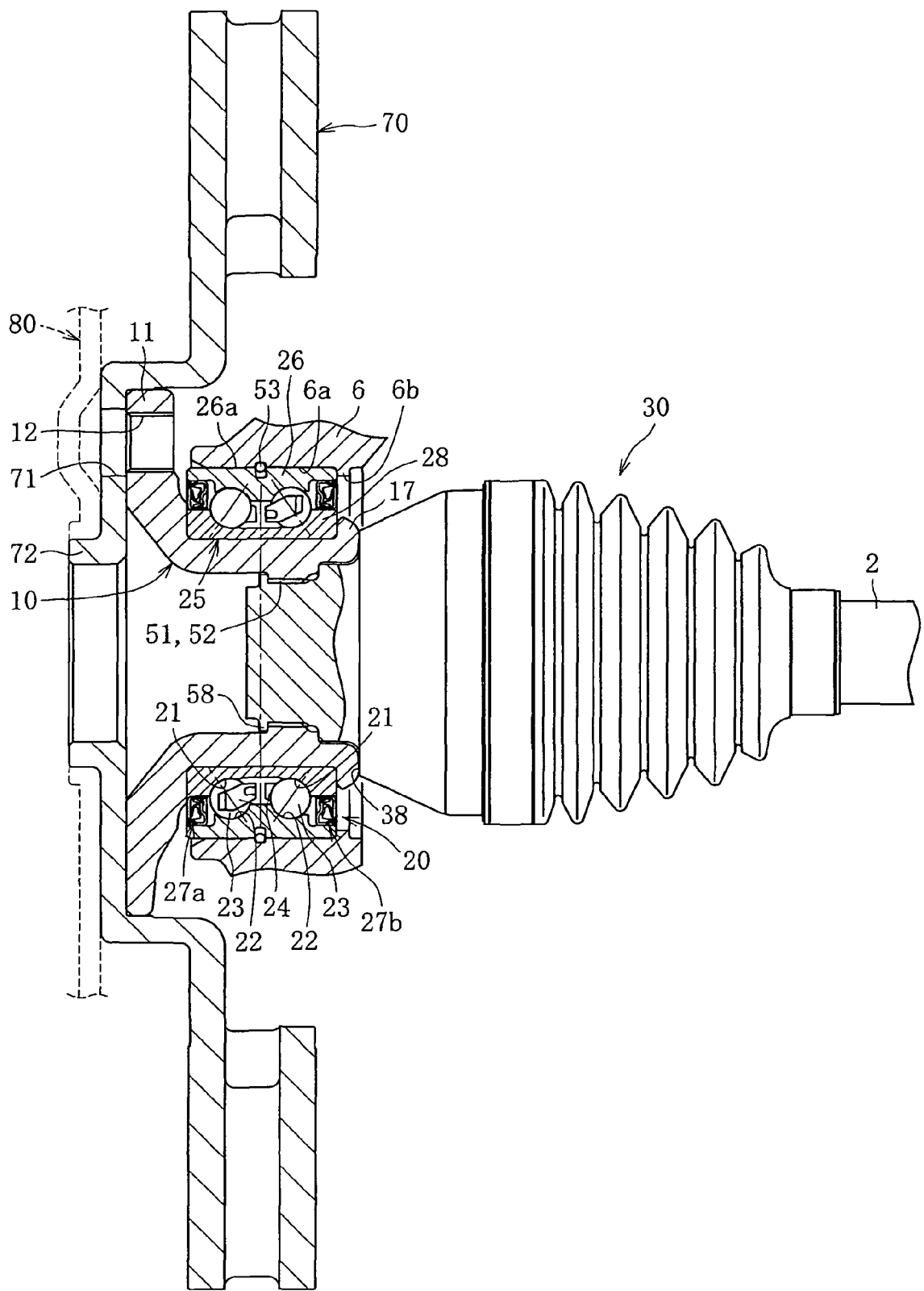
FIG. 33 A sectional view of a bearing unit for driving wheels.
Figure 34:
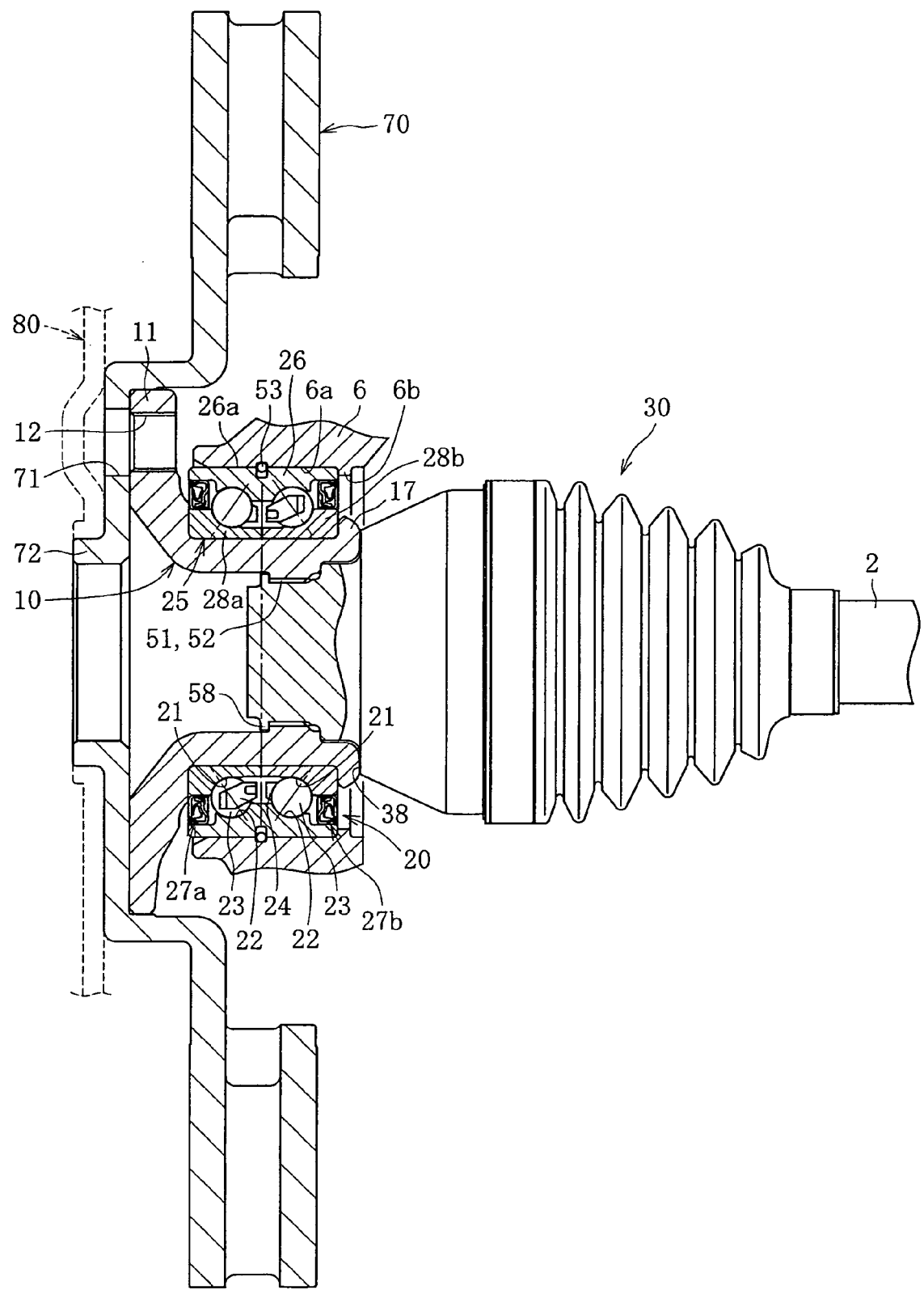
FIG. 34 A sectional view of a bearing unit for driving wheels.

FIG. 32, which corresponds to FIG. 1, illustrates a bearing unit in which the inner member 25 is formed by the hollow hub 10 and the inner ring 28. A similar construction can also be adopted in the bearing unit as illustrated in FIG. 2, in which the inner member 25 is formed by the integral inner ring 28 (see FIG. 33), and in the bearing unit as illustrated in FIG. 3, in which the inner member 25 is formed by the divisional inner rings 28a and 28b (see FIG. 34). While in the bearing units illustrated in FIGS. 32 through 34 the positioning of the hub 10 and the each inner ring 28, 28a, 28b is effected by the flange 17 formed by orbital forming, it is also possible to effect this positioning by the snap ring 29 as illustrated in FIG. 1.

Figure 37:
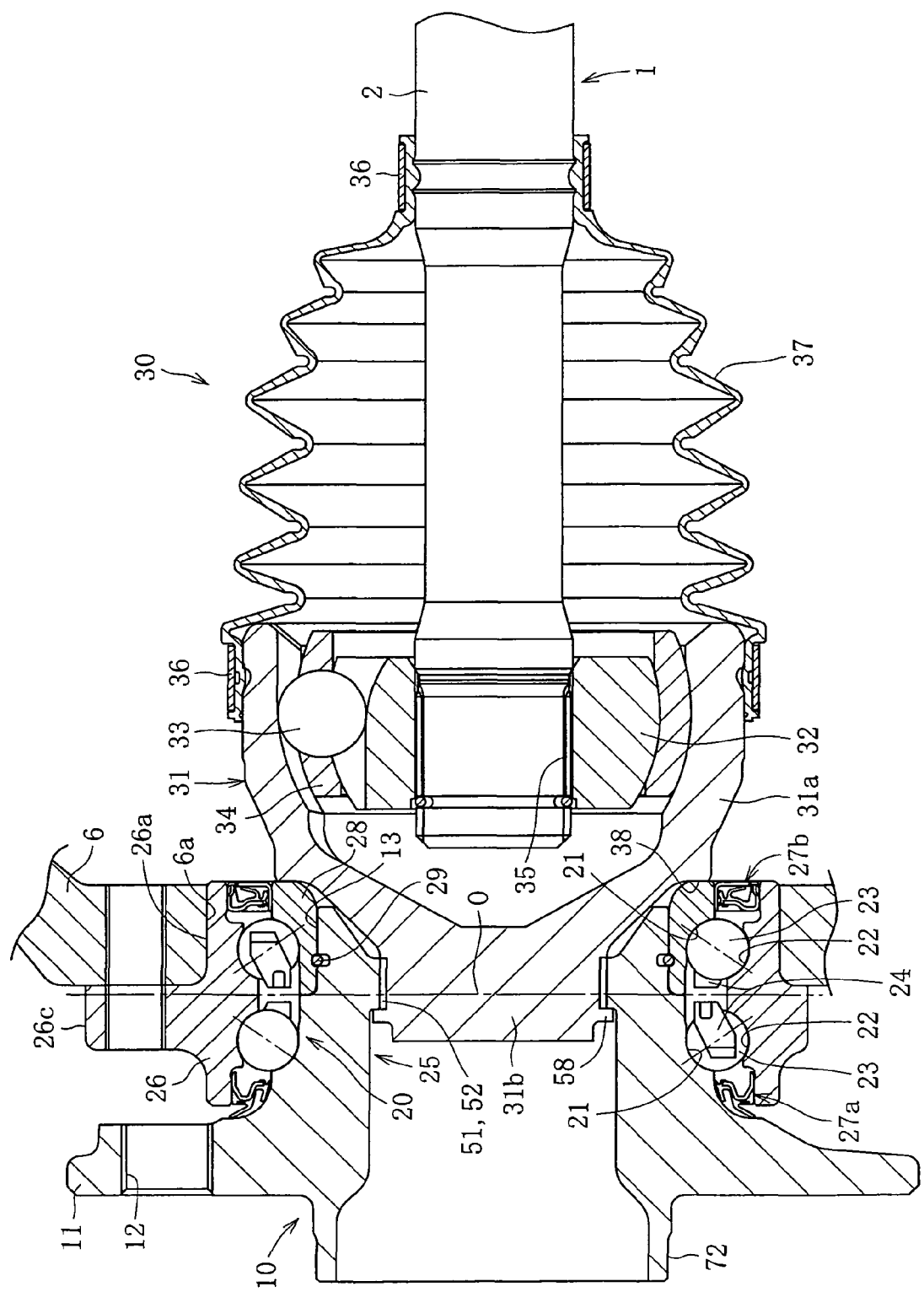
FIG. 37 A sectional view of a bearing unit for driving wheels.

While in the example described above the entire outer peripheral surface 26a of the outer member 26 is formed as a cylindrical surface and this outer peripheral surface is fit-engaged with and incorporated into the inner peripheral surface 6a of the knuckle member 6, it is also possible, as illustrated in FIG. 37, to form a flange 26c on the outer peripheral surface 26a of the outer member 26 and to fix the flange 26c to the knuckle member 6 by a bolt.

In this case, plastic joint is effected by the above-mentioned method between the stem portion 31b of the outer joint member 31 and the hub 10. This plastic joint is effected by forming the male portion 51 on one of the outer joint member 31 and the hub 10, forming the female portion 52 differing in configuration from the male portion 51 on the other member, and press-fitting the male portion 51 and the female portion 52 to each other. As a result, it is possible to firmly connect and integrate the male portion 51 and the female portion 52 with each other, and in this process, there is no need to use a nut. Further, this connection can be effected solely by press-fitting one of the male portion 51 and the female portion 52 into the other. Thus, it is possible to connect the hub 10 and the outer joint member 31 with high connection strength and with satisfactory workability. Further, because it is possible to omit the nut, it is possible to achieve a reduction in the size, weight, and cost of the bearing unit.

In the construction illustrated in FIG. 37, the outer peripheral surface 26a of the outer member 26 and the inner peripheral surface 6a of the knuckle member 6 are fit-engaged by clearance fit. FIG. 37 illustrates an example corresponding to FIG. 1, in which the inner member 25 is formed by the hub 10 and the inner ring 28. A similar construction is also applicable to an example corresponding to FIG. 2, in which, as illustrated in FIG. 38, the inner member 25 is formed by the integral inner ring 28, and to an example corresponding to FIG. 3, in which, as illustrated in FIG. 39, the inner member 25 is formed by divisional inner rings 28a and 28b.

Figure 38:
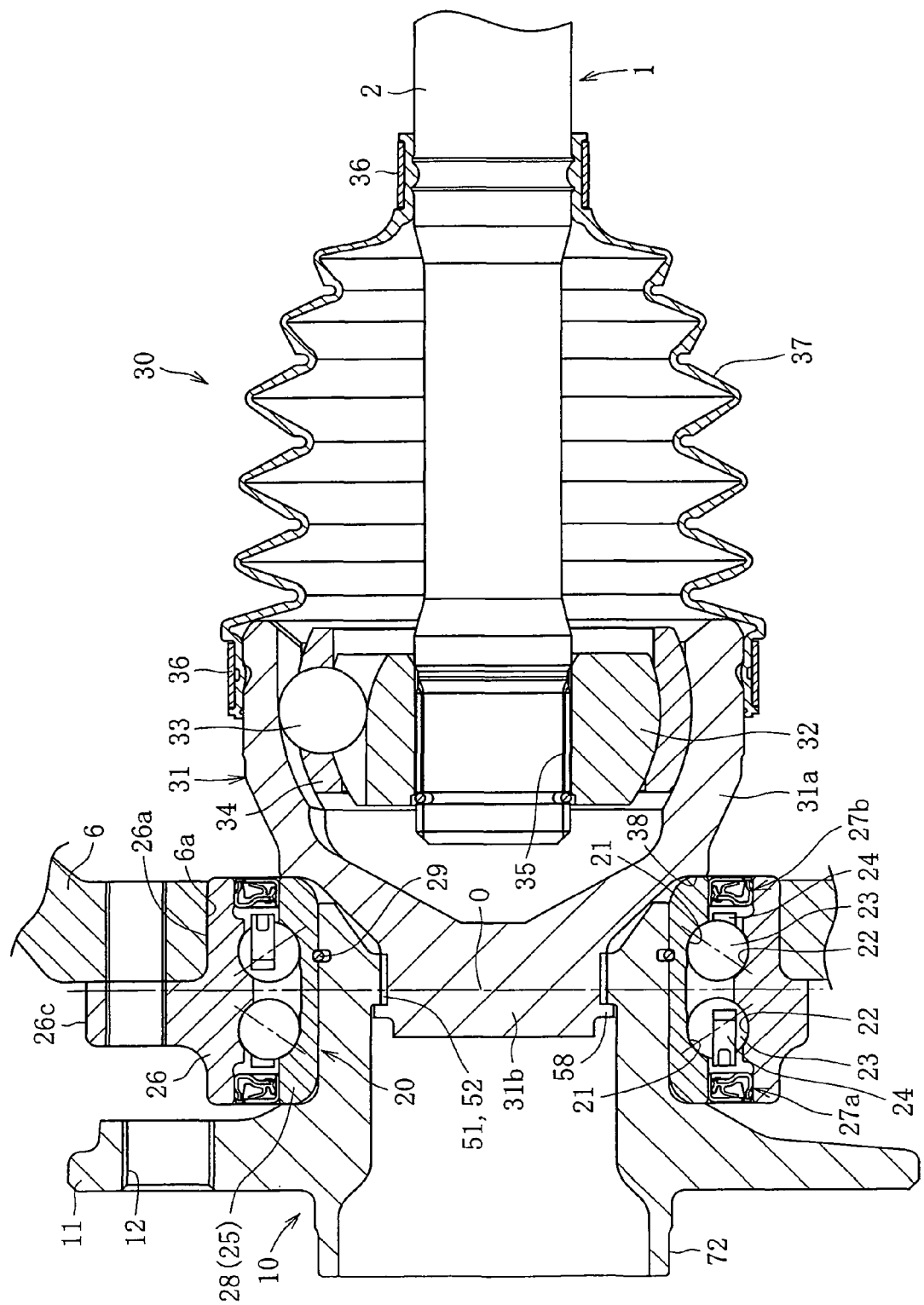
FIG. 38 A sectional view of a bearing unit for driving wheels.
Figure 39:
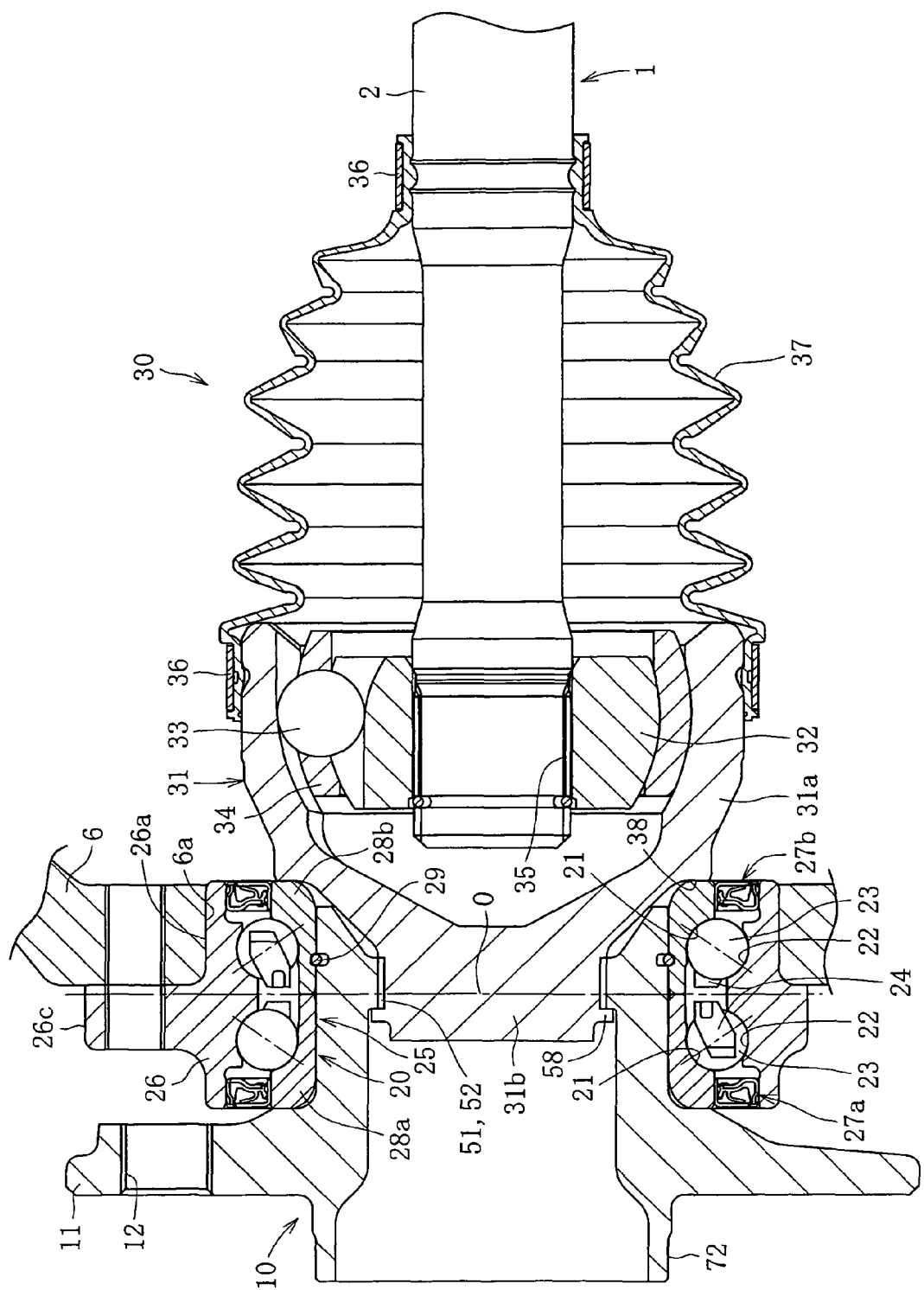
FIG. 39 A sectional view of a bearing unit for driving wheels.
Figure 40:
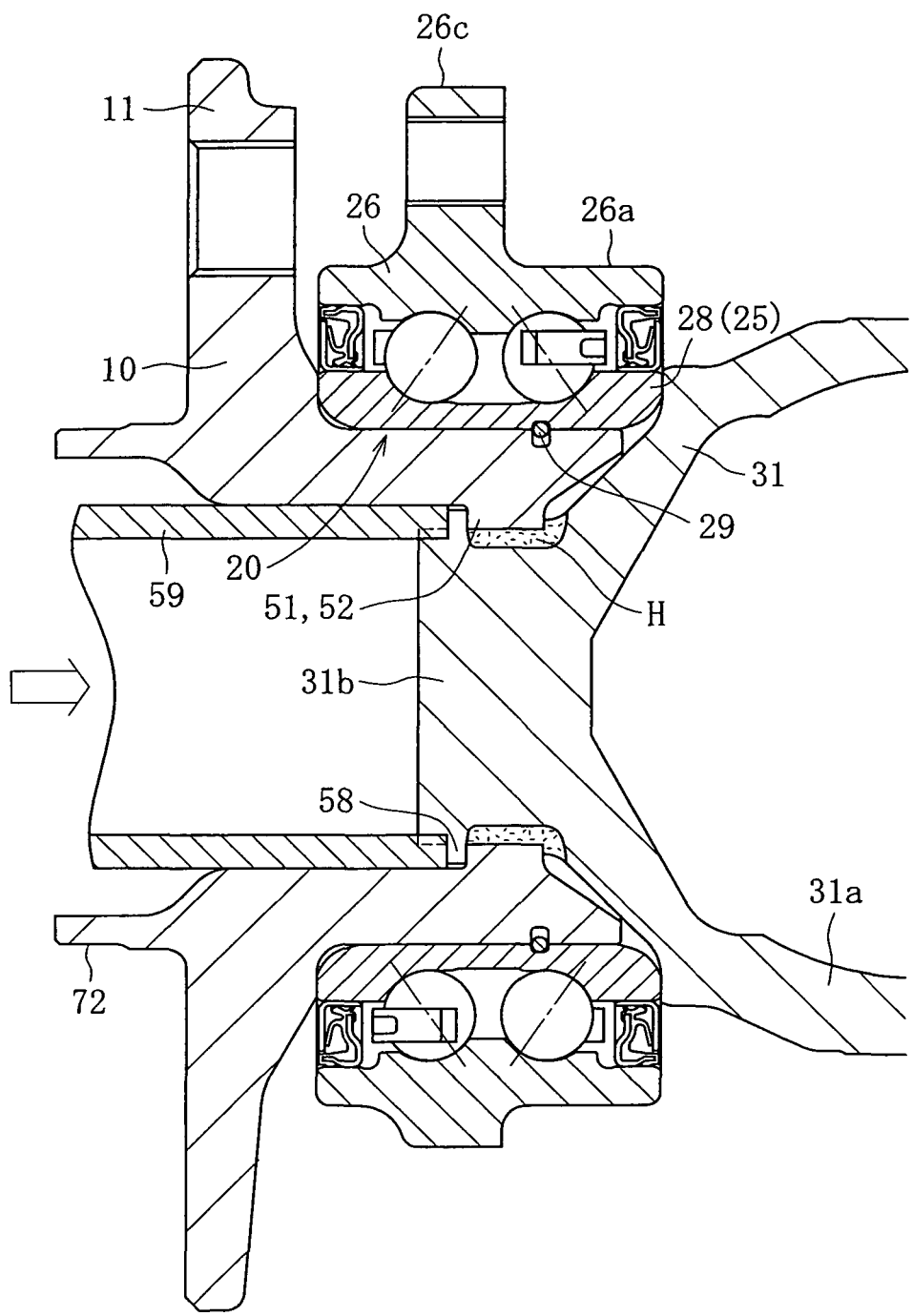
FIG. 40 A sectional view illustrating a plastic joint process for a hub and an outer joint member.

FIG. 40 illustrates a plastic joint process for the bearing unit illustrated in FIG. 38. As illustrated in the drawing, plastic joint is effected between the hub 10 and the outer joint member 31, and then the outer peripheral portion (indicated by dashed lines) of the solid shaft end portion of the stem portion 31b is caulked by the caulking tool 59 to form the flange portion 58, whereby the detachment prevention effect for the hub 10 is further enhanced. If sufficient connection strength is to be obtained solely by press-fitting the male portion 51 into the female portion 52, it is possible to omit this caulking process.

Figure 41:
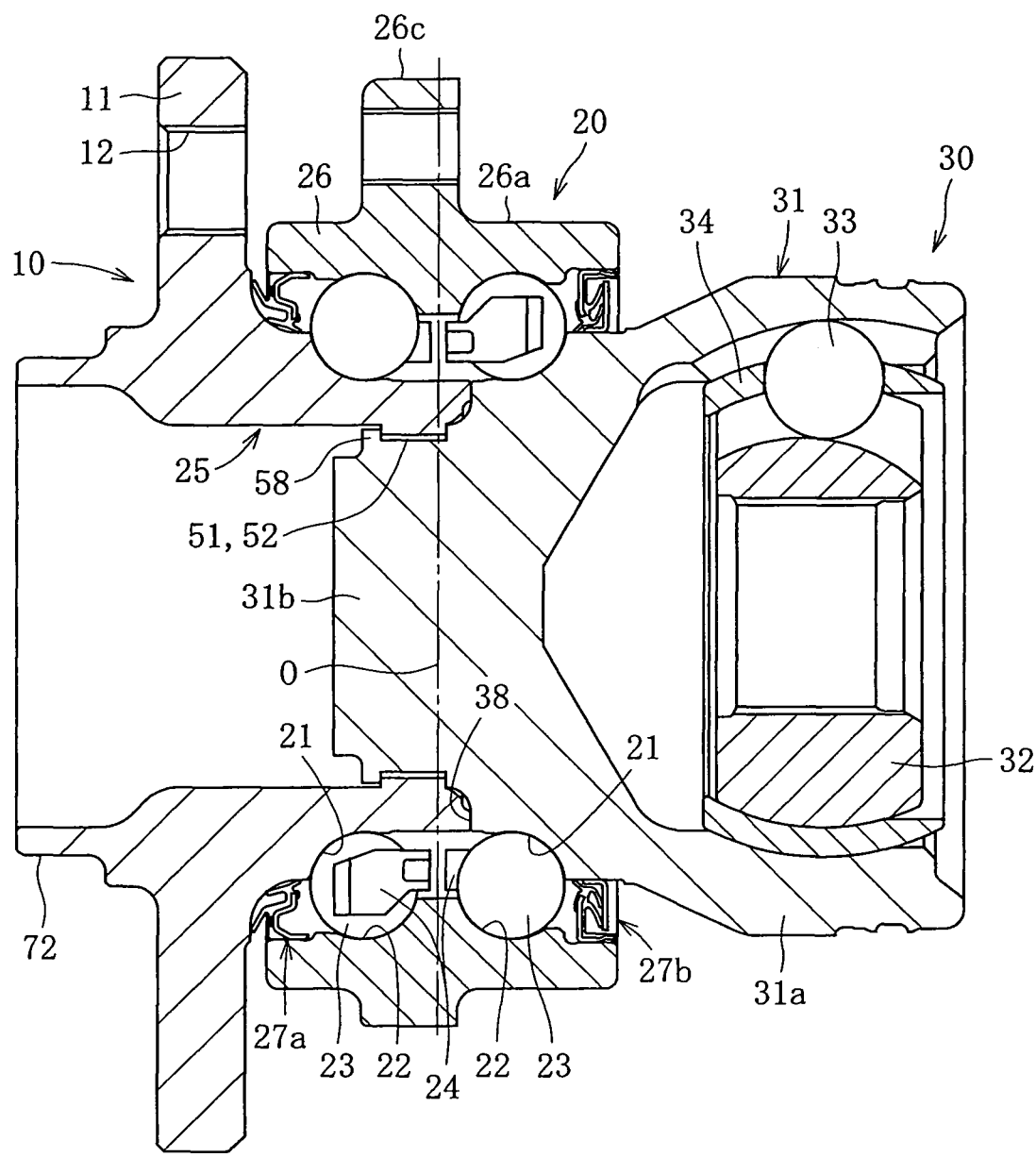
FIG. 41 A sectional view of a bearing unit for driving wheels.

FIG. 41 illustrates a bearing unit for driving wheels in which the out-board side inner race 21 is formed on the outer peripheral surface of the hub 10 and in which the in-board side inner race 21 is formed on the outer peripheral surface of the outer joint member 31. In this bearing unit also, the flange 26c is formed on the outer peripheral surface 26a of the outer member 26, and the flange 26c is fixed to the knuckle member 6 by a bolt. Plastic joint is effected between the hub 10 and the outer joint member 31 by the press-fitting of the male portion 51 into the female portion 52 and, further, by the caulking as illustrated in FIG. 40. The shoulder surface 38 of the outer joint member 31 is axially held in contact with the end surface of the hub 10, whereby the dimension between the double-row inner races 21 is determined, and a preset pre-load is imparted to the bearing portion 20. In this case, the hub 10 and the outer joint member 31 constitute the inner member 25 including the double-row inner races 21.

Figure 42:
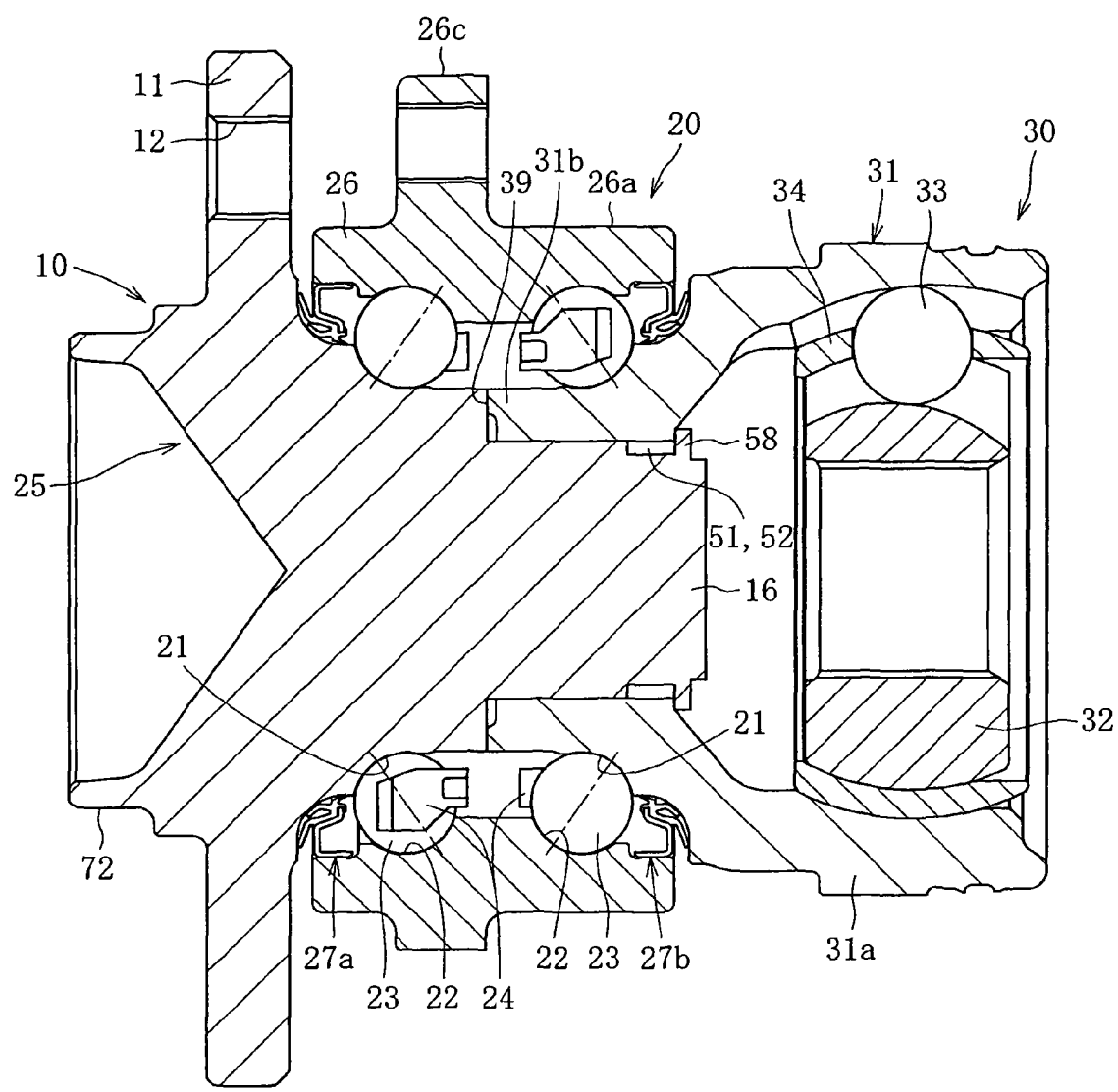
FIG. 42 A sectional view of a bearing unit for driving wheels.

In the embodiment illustrated in FIG. 41, the hub 10 is formed as a hollow member, and the solid stem portion 31b is fit-engaged with the inner periphery thereof, thereby effecting plastic joint therebetween. Conversely, it is also possible, as in the case of the embodiment illustrated in FIG. 42, to form the stem portion 31b as a hollow member, and to fit-engage the in-board side solid shaft end portion 16 of the hub 10 with the inner periphery of the stem portion 31b, thereby effecting plastic joint therebetween. An end surface 39 of the outer joint member 31 is axially held in contact with the hub 10, whereby the dimension between the double-row inner races 21 is determined, and a preset pre-load is imparted to the bearing portion 20. In this case, it is possible, for example, to form the male portion 51 on the outer peripheral surface of the solid shaft end portion 16 of the hub 10, and to form the female portion 52 on the inner peripheral surface of the stem portion 31b opposed thereto.

Figure 43:
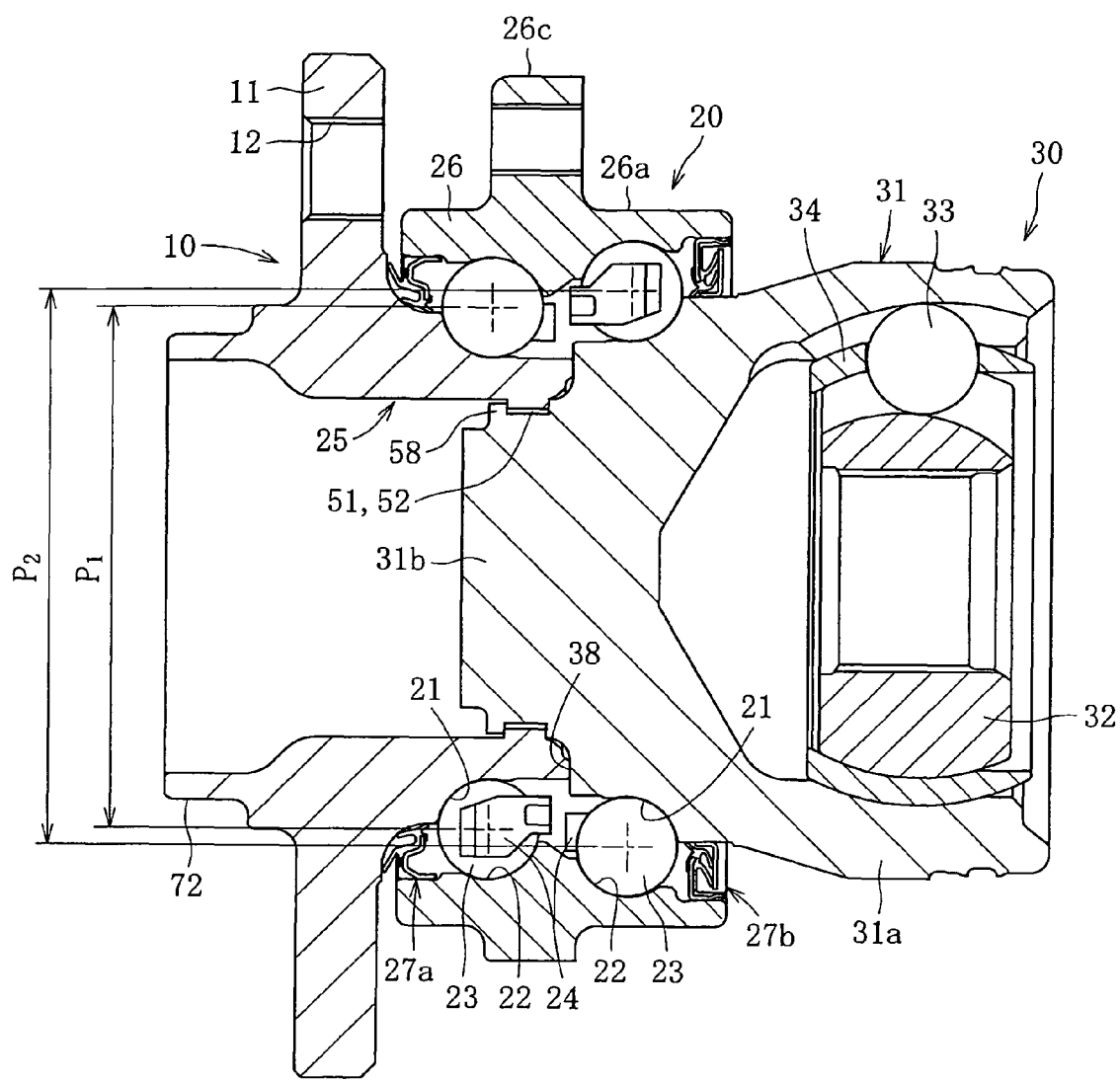
FIG. 43 A sectional view of a bearing unit for driving wheels endowed in a difference in rolling element PCD.
Figure 44:
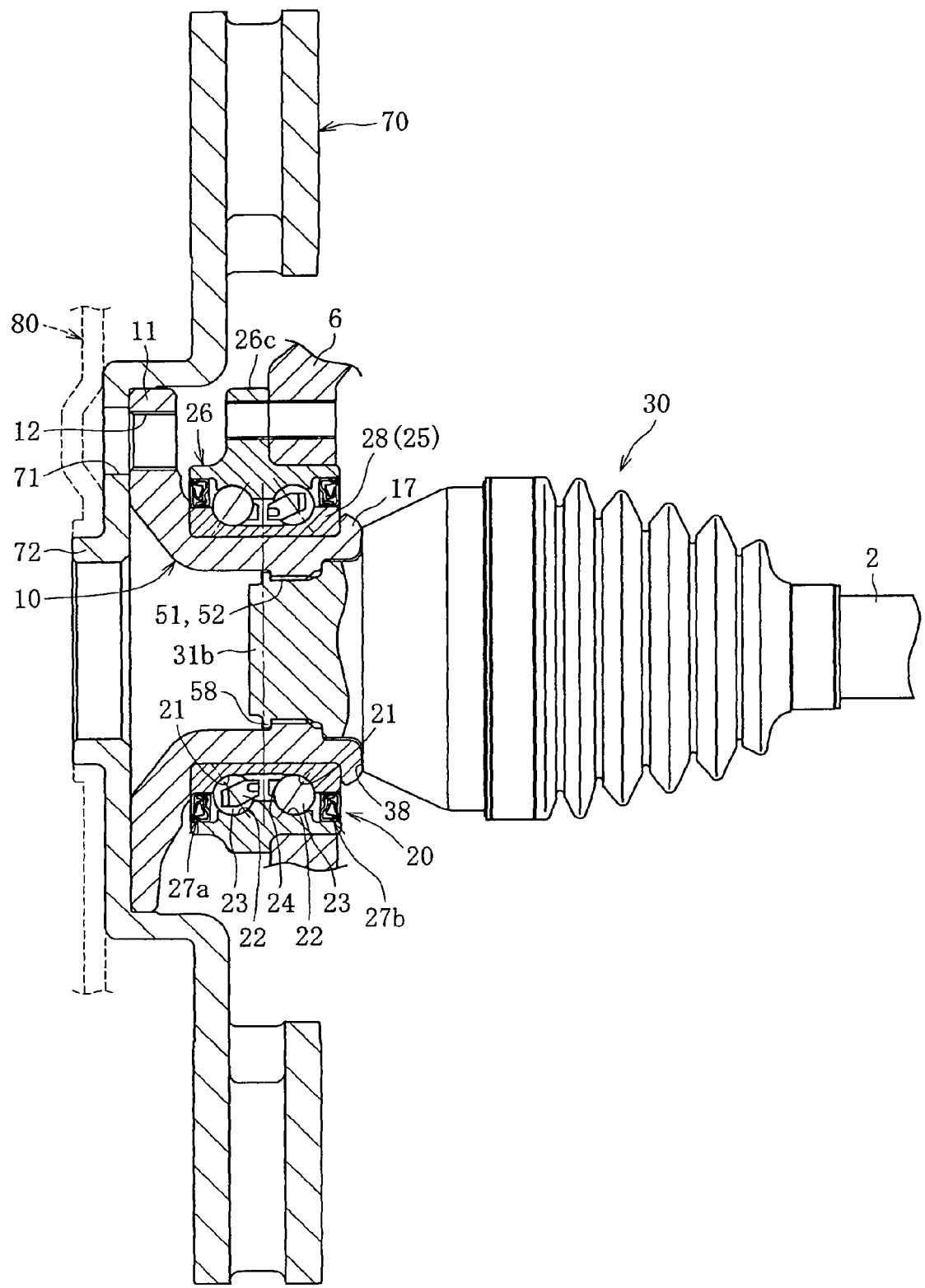
FIG. 44 A sectional view of a bearing unit for driving wheels.
Figure 45:
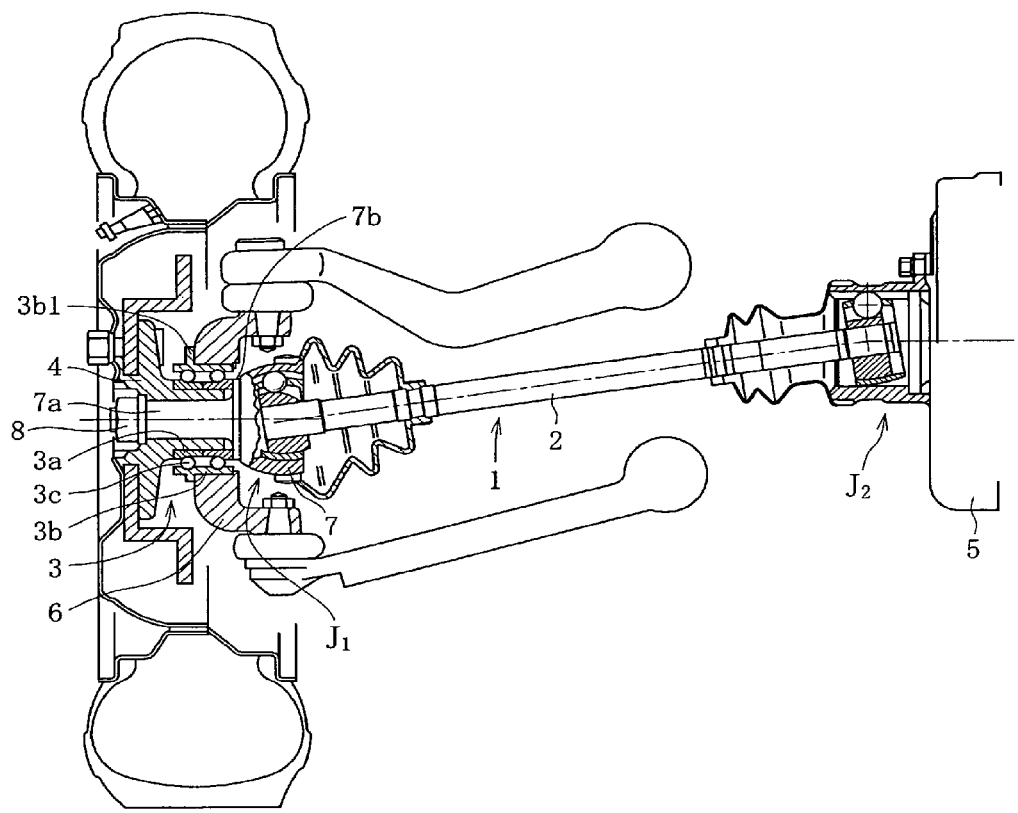
FIG. 45 A schematic sectional view of a vehicle suspension and the peripheral structure thereof.

In each of the examples illustrated in FIGS. 43 and 44, the flange 26c is formed on the outer peripheral surface 26a of the outer member 26, and the flange 26c is fixed to the knuckle member 6 by a bolt. The construction illustrated in FIG. 43 corresponds to the one illustrated in FIG. 20, and the construction illustrated in FIG. 44 corresponds to the one illustrated in FIG. 33.

DESCRIPTION OF REFERENCE SYMBOLS 1 drive shaft
2 intermediate shaft
6 knuckle member
6a inner peripheral surface
6b protrusion
6c snap ring groove
6c1 tapered surface
10 hub
11 flange
20 bearing portion
21 inner race
22 outer race
23 rolling element
24 cage
25 inner member
26 outer member
26a outer peripheral surface
27a seal
27b seal
28 inner ring
28a inner ring
28b inner ring
29 snap ring
30 out-board side constant velocity universal joint
31 outer joint member
31a mouth portion
31b stem portion
32 inner joint member
33 torque transmission ball
34 cage
36 boot band
37 boot
38 shoulder surface
39 cap
40 in-board side constant velocity universal joint
51 male portion
52 female portion
53 snap ring
56 relief portion
57 relief portion
70 brake rotor
72 pilot portion
80 wheel
Dn minimum inner diameter dimension of knuckle member
D1 maximum outer diameter dimension of in-board side constant velocity universal joint
D2 maximum outer diameter dimension of out-board side constant velocity universal joint
O axial center line

The invention claimed is:

1. A bearing unit for driving wheels including:
an outer member having a plurality of outer races in an inner periphery thereof;
an inner member having a hub provided with a flange for mounting a wheel and a plurality of inner races opposed to the outer races;
a plurality of rows of rolling elements arranged between the outer races and the inner races opposed to each other; and
an out-board side constant velocity universal joint having an outer joint member,
wherein a male portion is provided on one of the hub and the outer joint member, the male portion being formed as a rugged surface having a plurality of projections extending in an axial direction,
wherein a female portion is provided on the other of the outer joint member and the hub and differs in configuration from the male portion,
wherein the male portion is press-fitted into the female portion, along the axial direction, whereby a plurality of recesses fitting to the projections are formed in the female portion by entailing a plastic flow of the female portion with the press-fitting, such that a fitting portion for joining the hub and the outer joint member is formed between the projections and recesses, and
wherein the fitting portion is completed by the press-fitting of the male portion into the female portion along the axial direction.

2. A bearing unit for driving wheels according to claim 1, wherein the male portion has higher hardness than the female portion.

3. A bearing unit for driving wheels according to claim 1, wherein an outer peripheral surface of the outer member is fit-engaged with and incorporated into an inner peripheral surface of a knuckle member on a vehicle body side, and
wherein a maximum diameter dimension of the out-board side constant velocity universal joint is smaller than a minimum inner diameter dimension of the knuckle member.

4. A bearing unit for driving wheels according to claim 1, wherein the plurality of rows of rolling elements includes an in-board side row of rolling elements and an out-board side row of rolling elements, and wherein an axial center line of the in-board side rolling elements and the out-board side rolling elements passes through the fitting portion.

5. A bearing unit for driving wheels according to claim 1, wherein the plurality of rows of rolling elements includes an in-board side row of rolling elements and an out-board side row of rolling elements, and wherein the in-board side rolling elements and the out-board side rolling elements differ from each other in PCD.

6. A bearing unit for driving wheels according to claim 1, wherein the plurality of rows of rolling elements includes an in-board side row of rolling elements and an out-board side row of rolling elements, and wherein the in-board side rolling elements and the out-board side rolling elements differ from each other in rolling element diameter.

7. A bearing unit for driving wheels according to claim 1, wherein the plurality of rows of rolling elements includes an in-board side row of rolling elements and an out-board side row of rolling elements, and wherein the number of in-board side rolling elements differs from the number of out-board side rolling elements.

8. A bearing unit for driving wheels according to claim 1, wherein at least one of the rows of rolling elements is of a full-complement-bearing type.

9. A bearing unit for driving wheels according to claim 1, wherein the out-board side constant velocity universal joint comprises the outer joint member, an inner joint member, and torque transmission balls interposed between the outer joint member and the inner joint member.

10. A bearing unit for driving wheels according to claim 1, wherein the outer member comprises a pair of bearing outer rings each including an outer race, and a spacer interposed between the bearing outer rings.

11. A bearing unit for driving wheels according to claim 1, wherein a plurality of inner races are directly formed on an outer peripheral surface of the hub.

12. A bearing unit for driving wheels according to claim 1, wherein the inner member includes an inner ring with one of the inner races formed thereon, the inner ring being fit-engaged with an outer periphery of the hub, and
wherein another one of the inner races is formed on an outer peripheral surface of the hub.

13. A bearing unit for driving wheels according to claim 12, wherein axial positioning is effected on the inner ring and the hub by a flange formed by outward plastic deformation of an end portion of the hub and contacting with an in-board side end surface of the inner ring.

14. A bearing unit for driving wheels according to claim 12, further comprising a snap ring arranged between the inner ring and the hub, wherein axial positioning is effected on the inner ring and the hub by the snap ring.

15. A bearing unit for driving wheels according to claim 1, wherein the inner member includes a pair of inner rings fit-engaged with an outer periphery of the hub.

16. A bearing unit for driving wheels according to claim 1, wherein one of the inner races of the inner member is formed on the hub, and another of the inner races of the inner member is formed on the outer joint member of the out-board side constant velocity universal joint.

17. A bearing unit for driving wheels according to claim 1, wherein a pilot portion to be fit-engaged with an inner periphery of a wheel is provided on a separate member other than the hub.

18. A bearing unit for driving wheels according to claim 17, wherein the pilot portion is formed on a brake rotor.

19. A method of manufacturing a bearing unit for driving wheels, the bearing unit including an outer member having a plurality of outer races in an inner periphery thereof, an inner member having a hub provided with a flange for mounting a wheel and a plurality of inner races opposed to the outer races, a plurality of rows of rolling elements arranged between the outer races and the inner races opposed to each other, and an out-board side constant velocity universal joint having an outer joint member, said method comprising:
forming a male portion on one of the hub and the outer joint member, the male portion being formed as a rugged surface having a plurality of projections extending in an axial direction;
forming a female portion, which differs in configuration from the male portion, on the other of the outer joint member and the hub; and
press-fitting the male portion into the female portion, along the axial direction, whereby a plurality of recesses fitting to the projections are formed in the female portion by entailing a plastic flow of the female portion with said press-fitting, such that a fitting portion for joining the hub and the outer joint member is formed between the projections and recesses,
wherein the fitting portion is completed by the press-fitting of the male portion into the female portion along the axial direction.

* * * * *